US012801539B2

(12) United States Patent
Liu

(10) Patent No.: US 12,801,539 B2
(45) Date of Patent: Nov. 17, 2026

(54) MEMORY ADDRESS MAPPING METHOD, MEMORY MANAGEMENT UNIT, ELECTRONIC DEVICE, AND STORAGE MEDIUM

(71) Applicants: T-Head (Shanghai) Semiconductor Co., Ltd., Shanghai Free Trade Area (CN); Alibaba (China) Co., Ltd., Zhejiang (CN)

(72) Inventor: Junlong Liu, ShenZhen City (CN)

(73) Assignees: T-HEAD (SHANGHAI) SEMICONDUCTOR CO., LTD., Shanghai Free Trade Area (CN); ALIBABA (CHINA) CO., LTD., Zhejiang (CN)

( * ) Notice: Subject to any disclaimer, the term of this patent is extended or adjusted under 35 U.S.C. 154(b) by 34 days.

(21) Appl. No.: 19/058,339

(22) Filed: Feb. 20, 2025

(65) Prior Publication Data

US 2025/0298752 A1 Sep. 25, 2025

(30) Foreign Application Priority Data

Mar. 25, 2024 (CN) ........................ 202410347911.5

(51) Int. Cl.

*G06F 12/00* (2006.01)
*G06F 12/02* (2006.01)
*G06F 12/14* (2006.01)

(52) U.S. Cl.

CPC ........ *G06F 12/145* (2013.01); *G06F 12/0246* (2013.01); *G06F 12/1483* (2013.01)

(58) Field of Classification Search

CPC . G06F 12/0246; G06F 12/145; G06F 12/1483
See application file for complete search history.

(56) References Cited

U.S. PATENT DOCUMENTS

2017/0177500 A1* 6/2017 Shanbhogue ....... G06F 12/1027
2019/0294339 A1* 9/2019 Bolkhovitin .......... G06F 3/0607
2024/0264768 A1* 8/2024 Tan ....................... G06F 12/109

FOREIGN PATENT DOCUMENTS

CN 115658559 B 4/2023
CN 113568845 B 7/2023
CN 118312449 B 8/2024

* cited by examiner

*Primary Examiner* — Craig S Goldschmidt
(74) *Attorney, Agent, or Firm* — Birch, Stewart, Kolasch & Birch, LLP

(57) ABSTRACT

A memory address mapping method, a memory management unit, an electronic device, and a storage medium are provided. The method includes: receiving a virtual address from a current process; determining an address segment table and an address segment attribute table according to identification information of the current process; finding base address information from the address segment table according to a first virtual address segment, where the base address information indicates a base address of a target physical address space segment, and a physical address mapped to the virtual address is located in the target physical address space segment; finding offset information from the address segment attribute table according to a second virtual address segment, where the offset information indicates an offset of the physical address; and determining the physical address mapped to the virtual address according to the base address information and the offset information.

14 Claims, 10 Drawing Sheets

MEMORY ADDRESS MAPPING METHOD, MEMORY MANAGEMENT UNIT, ELECTRONIC DEVICE, AND STORAGE MEDIUM

CROSS-REFERENCE TO RELATED APPLICATIONS

The present application claims the priority of Chinese Patent Application No. 202410347911.5, entitled "Memory Address Mapping Method, Memory Management Unit, Electronic Device, And Storage Medium", and filed with the China National Intellectual Property Administration on Mar. 25, 2024, which is incorporated in the present disclosure by reference in its entirety.

TECHNICAL FIELD

Embodiments of the present disclosure relate to the field of computer technology, and in particular, to a memory address mapping method, a memory management unit, an electronic device, and a storage medium.

BACKGROUND

In applications of virtualization and the like, a memory management unit (MMU) maps a virtual address to a physical address, so that a process can access a memory space through the virtual address and cannot access unallocated memory spaces.

At present, the mapping relationship between the virtual address and the physical address is stored in a page table of a radix tree structure, and the memory management unit queries the page table to determine the physical address mapped to the virtual address.

However, as the memory capacity increases, the quantity of levels of the page table of the radix tree structure increases, and the memory management unit needs to query the page table level by level. As the quantity of levels of the page table increases, the memory management unit takes a relatively long time to determine the physical address mapped to the virtual address, which leads to lower efficiency in mapping virtual addresses to physical addresses.

SUMMARY

Embodiments of the present disclosure provide a memory address mapping method, a memory management unit, an electronic device, and a non-transitory storage medium.

According to one aspect of the embodiments of the present disclosure, a memory address mapping method is provided. The method includes: receiving a virtual address from a current process; determining an address segment table and an address segment attribute table corresponding to the current process according to identification information of the current process; finding base address information from the address segment table according to a first virtual address segment included in the virtual address, where the base address information is used for indicating a base address of a target physical address space segment, and the target physical address space segment is a physical address space segment where a physical address mapped to the virtual address is located; finding offset information from the address segment attribute table according to a second virtual address segment included in the virtual address, where the offset information is used for indicating an offset of the physical address mapped to the virtual address within the target physical address space segment; and determining the physical address mapped to the virtual address according to the base address information and the offset information.

According to another aspect of the embodiments of the present disclosure, a memory management unit is provided. The memory management unit includes: a receiving circuit, configured to receive a virtual address from a current process; a table obtaining circuit, configured to determine an address segment table and an address segment attribute table corresponding to the current process according to identification information of the current process; a first circuit lookup circuit, configured to find base address information from the address segment table according to a first virtual address segment included in the virtual address, where the base address information is used for indicating a base address of a target physical address space segment, and the target physical address space segment is a physical address space segment where a physical address mapped to the virtual address is located; a second table lookup circuit, configured to find offset information from the address segment attribute table according to a second virtual address segment included in the virtual address, where the offset information is used for indicating an offset of the physical address mapped to the virtual address within the target physical address space segment; and an integration circuit, configured to determine the physical address mapped to the virtual address according to the base address information and the offset information.

According to another aspect of the embodiments of the present disclosure, an electronic device is provided. The electronic device includes: a processor, a memory, a communications interface, and a communications bus. The processor, the memory, and the communications interface complete communication with each other through the communications bus; and the memory is configured to store at least one executable instruction that enables the processor to perform an operation corresponding to the memory address mapping method described above.

According to another aspect of the embodiments of the present disclosure, a computer storage medium is provided. The computer storage medium stores a computer program that, when executed by a processor, implements the memory address mapping method described above.

According to another aspect of the embodiments of the present disclosure, a computer program product is provided. The computer program product includes computer instructions that instruct a computing device to perform the memory address mapping method described above.

According to the above technical solutions, the base address information is found from the address segment table according to the first virtual address segment included in the virtual address, where the base address information indicates the base address of the target physical address space segment where the physical address mapped to the virtual address is located; the offset information is found from the address segment attribute table according to the second virtual address segment included in the virtual address, where the offset information indicates the offset of the physical address mapped to the virtual address within the target physical address space segment; and then the physical address mapped to the virtual address is determined according to the base address information and the offset information. Because the address segment table and the address segment attribute table are found in parallel, and the address segment table and the address segment attribute table are found separately according to the first virtual address segment and the second virtual address segment, the lookup depth for the address segment table and the address segment attribute table can be reduced, and the time for the address segment table and the address segment attribute table is shortened, which can improve the efficiency of mapping virtual addresses to physical addresses.

BRIEF DESCRIPTION OF DRAWINGS

In order to describe the technical solutions in the embodiments of the present disclosure or in the relevant art more clearly, the accompanying drawings used in the description of the embodiments or the relevant art will be briefly introduced below. The accompanying drawings in the description below are merely some embodiments recited in the embodiments of the present disclosure, and those of ordinary skill in the art may also derive other drawings according to these drawings.

DETAILED DESCRIPTION

The present disclosure is described below in conjunction with embodiments, but the present disclosure is not only limited to these embodiments. In the following detailed description of the present disclosure, some specific details are described. The present disclosure can also be fully understood by those skilled in the art without the description of these details. To avoid confusing the essence of the present disclosure, well-known methods, processes, and flows are not described in detail. In addition, the accompany drawings are not necessarily drawn to scale.

Some phrases or terms in the present disclosure are applicable to the following explanations.

Memory management unit (MMU) is a hardware device provided between a processor and a memory in a computer system, for processing an access request issued by a program, converting a virtual address into a physical address, and managing and protecting the memory.

Virtual machine (VM) is a complete computer system simulated by software, having complete hardware system functions, and running in a completely isolated environment.

Radix tree: a more space-efficient Trie. For a parent node of a radix tree, if the number of child nodes of the parent node is 1, the child node of the parent node is merged into the parent node.

Linear list: a type of data structure and a finite sequence of n data elements with the same characteristics. A data element is an abstract symbol, and its specific meaning generally varies in different situations.

Exemplary System

Figure 1:
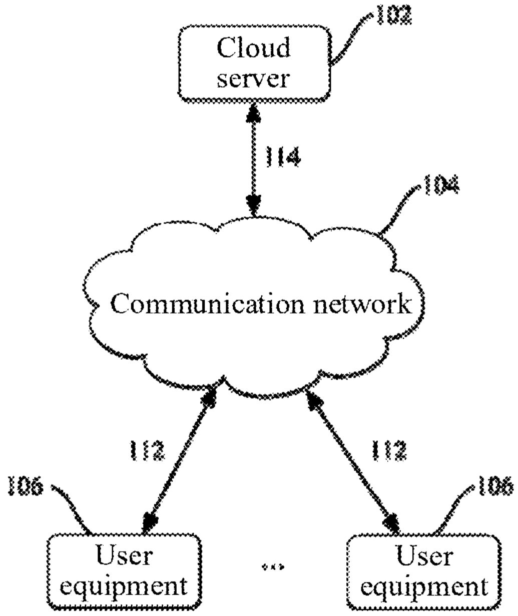
FIG. 1 is a schematic diagram of an exemplary system according to an embodiment of the present disclosure.

FIG. 1 illustrates an exemplary system applicable to a memory address mapping method according to the embodiments of the present disclosure. As shown in FIG. 1, the system may include a cloud server 102, a communication network 104, and at least one user equipment 106. FIG. 1 shows a plurality of user equipment 106. It should be noted that the solutions of the embodiments of the present disclosure may be applied to at least one of the cloud server 102 and the user equipment 106.

The cloud server 102 may be any suitable device configured to store information, data, programs, and/or any other suitable type of content, including but not limited to a distributed storage system device, a server cluster, a computing cloud server cluster, and the like. In some embodiments, the cloud server 102 may perform any suitable function. For example, in some embodiments, the cloud server 102 may be configured to build a virtualized environment, a process such as a virtual machine or a network card drive created based on the virtualized environment issues a memory access request, and a memory management unit included in the cloud server 102 converts a virtual address included in the memory access request into a physical address, and then reads and writes, through the physical address, a memory space to be accessed by the process. As an optional example, in some embodiments, the memory management unit included in the cloud server 102 may divide the virtual address included in the memory access request into two virtual address segments, look up two tables for two corresponding physical address segments in parallel through the two virtual address segments, and then determine the physical address mapped to the virtual address according to the found two physical address segments, which reduces the depth of table lookup and improves the parallelism of table lookup, thereby improving the efficiency of mapping virtual addresses to physical addresses.

The communication network 104 may be any suitable combination of one or more wired and/or wireless networks. For example, the communication network 104 includes any one or more of the following: Internet, intranet, wide area networks (WANs), local area networks (LANs), wireless networks, digital subscriber line (DSL) networks, frame relay networks, asynchronous transfer mode (ATM) networks, virtual private networks (VPNs) and/or any other suitable communication networks. The user equipment 106 is connected to the communication network 104 by one or more communication links (such as communication links 112), and the communication network 104 is linked to the cloud server 102 by one or more communication links (such as communication links 114). The communication link may be any communication link suitable for transmitting data between the cloud server 102 and the user equipment 106, such as a network link, a dial-up link, a wireless link, a hard wired link, any other suitable communication link, or any suitable combination of such links.

The user equipment 106 may include any one or more user equipment suitable for interaction. In some embodiments, after receiving a request from the user equipment 106, the cloud server 102 may build a virtual machine in a virtualized environment for the user equipment 106 to use and operate. The virtual machine may send a memory access request to the memory management unit included in the cloud server 102 based on a user's operation instruction. After receiving the memory access request, the memory management unit included in the cloud server 102 maps a virtual address included in the memory access request to a physical address, and then reads and writes, through the physical address, a memory space to be accessed by the virtual machine. The user equipment 106 may be any suitable type of device. For example, the user equipment 106 may be a mobile device, a tablet, a laptop, a desktop computer, a wearable computer, a vehicle system, and/or any other suitable type of user equipment.

The embodiments of the present disclosure mainly focus on the process of mapping a virtual address to a corresponding physical address by the memory management unit. The process of mapping a virtual memory address to a physical address will be described in detail below.

Memory Address Mapping Method

Based on the above system, the embodiments of the present disclosure provide a memory address mapping method. The following provides a detailed explanation of the memory address mapping method through a plurality of embodiments.

Figure 2:
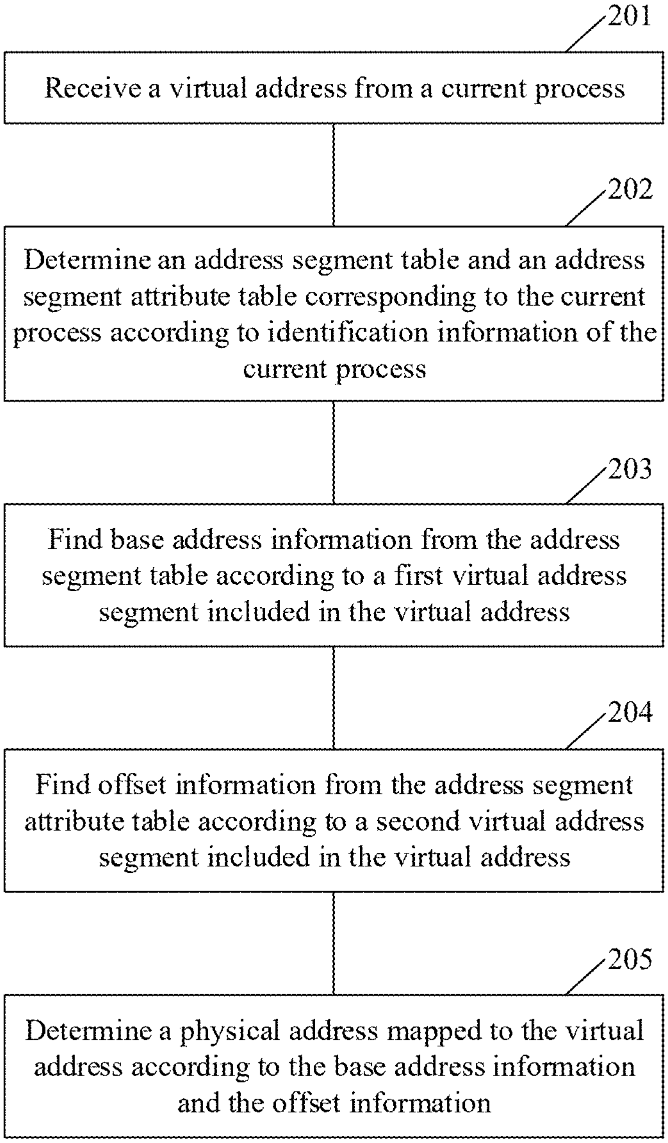
FIG. 2 is a flowchart of a memory address mapping method according to an embodiment of the present disclosure.

FIG. 2 is a flowchart of a memory address mapping method according to an embodiment of the present disclosure. As shown in FIG. 2, the memory address mapping method includes the following steps.

In Step 201: a virtual address is received from a current process.

A plurality of processes may send memory access requests to a memory management unit. The processes may be various processes involving memory access running on a central processing unit (CPU) or graphics processing unit (GPU). For example, the processes may be virtual machines, network card drives, and the like. The memory management unit may process the memory access requests from different processes in parallel. The memory management unit adopts the same strategy to process the memory access requests from the different processes. The embodiments of the present disclosure focus on the process of processing the memory access requests by the memory management unit. In order to distinguish different processes, the embodiments of the present disclosure explain the current process among the plurality of processes as an example. The current process may be any process among the plurality of processes that can access a memory.

When accessing the memory, the current process sends a memory access request to the memory management unit, the memory access request including a virtual address to be accessed by the current process. By parsing the memory access request, the virtual address to be accessed by the current process may be obtained. The embodiments of the present disclosure do not limit the length of the virtual address. For example, the length of the virtual address may be 32 bits, 64 bits, or 128 bits.

Step 202: an address segment table and an address segment attribute table corresponding to the current process are determined according to identification information of the current process.

The identification information of different processes is different, so different processes can be distinguished through the identification information. A process may send a memory access request to the memory management unit in the form of a data stream, the data stream carrying a stream identity number. The stream identity numbers carried by the data streams sent by different processes are different, so the identification information of a process may be the stream identity number carried by the data stream sent by the process.

For a process that can access a memory through the memory management unit, an address segment table and an address segment attribute table corresponding to the process are pre-created. Different processes may correspond to the same address segment table, but correspond to different address segment attribute tables.

The address segment table is used for recording a corresponding relationship between a virtual address segment and a physical address space segment. The physical address space segment indicates a segment of continuous memory space, and different physical address space segments indicate different memory spaces. The address segment table may record corresponding relationships between a plurality of virtual address segments and physical address space segments. In the address segment table, a physical address space segment may be represented by a physical base address of the physical address space segment, or by one or more high bits of the physical base address of the physical address space segment.

The address segment attribute table is used for recording a corresponding relationship between a virtual address segment and an offset within a physical address space segment. The offset within the physical address space segment is used for indicating an offset address value within the corresponding physical address space segment, or indicating one or more high bits of the offset address value within the corresponding physical address space segment. The address segment attribute table may record corresponding relationships between a plurality of virtual address segments and offsets within physical address space segments.

It should be noted that the virtual address segments recorded in the address segment table and the address segment attribute table are different address segments in the virtual address. The virtual address segments recorded in the address segment table and the address segment attribute table are continuous and do not overlap in the virtual address. In one example, when an effective virtual address is 52 bits, the virtual address segment recorded in the address segment table is 32 to 51 bits of the virtual address, and the virtual address segment recorded in the address segment attribute table is 12 to 31 bits of the virtual address.

After the virtual address of the current process is obtained, the address segment table and address segment attribute table corresponding to the current process may be determined from at least one pre-created address segment table and a plurality of pre-created address segment attribute tables according to the identification information of the current process.

In Step 203: base address information is found from the address segment table according to a first virtual address segment included in the virtual address.

After the address segment table corresponding to the current process is obtained, the first virtual address segment may be extracted from the virtual address to be accessed by the current process, and then the base address information corresponding to the first virtual address segment is found from the address segment table corresponding to the current process. The length of the first virtual address segment is equal to the length of the virtual address segment recorded in the address segment table, and the location of the first virtual address segment in the virtual address is the same as the location of the virtual address segment recorded in the address segment table in the corresponding virtual address. For example, if the virtual address segment recorded in the address segment table is 32 to 51 bits of the corresponding virtual address, 32 to 51 bits are extracted from the virtual address to be accessed by the current process as the first virtual address segment.

Notably, unless otherwise specified, the virtual address in the subsequent embodiments refers to the virtual address from the current process, namely, the virtual address to be accessed by the current process.

The physical address space segment where the physical address mapped to the virtual address is located is defined as a target physical address space segment, and the base address information found from the address segment table may indicate a base address of the target physical address space segment. The target physical address space segment indicates a segment of contiguous memory space, and the memory location indicated by the physical address mapped to the virtual address is within that memory space.

If two virtual addresses including the same first virtual address segment are from the same process, or if the two virtual addresses are from two different processes corresponding to the same address segment table, the base address information determined based on the two virtual addresses is the same, that is, the memory locations indicated by the two physical addresses mapped to the two virtual addresses are within the same segment of contiguous memory space.

In Step 204: offset information is found from the address segment attribute table according to a second virtual address segment included in the virtual address.

After the address segment attribute table corresponding to the current process is obtained, the second virtual address segment may be extracted from the virtual address, and then the offset information corresponding to the second virtual address segment is found from the address segment attribute table corresponding to the current process. The length of the second virtual address segment is equal to the length of the virtual address segment recorded in the address segment attribute table, and the location of the second virtual address segment in the virtual address is the same as the location of the virtual address segment, recorded in the address segment attribute table, in the corresponding virtual address. For example, if the virtual address segment recorded in the address segment attribute table is 12 to 31 bits of the corresponding virtual address, 12 to 31 bits are extracted from the virtual address to be accessed by the current process as the second virtual address segment.

In the virtual address, the first virtual address segment is adjacent to the second virtual address segment, and the first virtual address segment does not overlap with the second virtual address segment.

The offset information found from the address segment attribute table may indicate an offset of the physical address mapped to the virtual address within the target physical address space segment. In one example, the offset information may indicate the offset of the physical address mapped to the virtual address within the target physical address space segment. In this case, the second virtual address segment includes low bits prior to the first virtual address segment in the virtual address. For example, if the first virtual address segment is 32 to 51 bits in the virtual address, the second virtual address segment includes 0 to 31 bits in the virtual address. Then, the physical address mapped to the virtual address may be directly determined according to the base address information and the offset information. In another example, the offset information may indicate the offset of a physical address space sub-segment within the target physical address space segment, the physical address space sub-segment is the physical address segment where the physical address mapped to the virtual address is located, and the physical address space sub-segment is a subset of the target physical address space segment. The target physical address space segment may include a plurality of physical address space sub-segments. In this case, there is at least one low bit prior to the second virtual address segment in the virtual address. For example, the first virtual address segment is 32 to 51 bits in the virtual address, and the second virtual address segment includes 12 to 31 bits in the virtual address. Then, the physical address mapped to the virtual address is determined according to the base address information, the offset information, and the low bits prior to the second virtual address segment in the virtual address.

It should be noted that steps 203 and 204 may be carried out simultaneously.

In Step 205: a physical address mapped to the virtual address is determined according to the base address information and the offset information.

The base address information may indicate the base address of the target physical address space segment, and the offset information may indicate the offset of the physical address mapped to the virtual address within the target physical address space segment, so the physical address mapped to the virtual address may be determined according to the base address information and the offset information.

If the second virtual address segment includes low bits prior to the first virtual address segment in the virtual address, the physical address mapped to the virtual address may be directly determined according to the base address information and the offset information. If there is at least one low bit prior to the second virtual address segment in the virtual address, the physical address mapped to the virtual address is determined according to the base address information, the offset information, and each low bit prior to the second virtual address segment in the virtual address.

After determining the physical address mapped to the virtual address, the memory management unit may read and write the memory according to the determined physical address.

In the embodiment of the present disclosure, the base address information is found from the address segment table according to the first virtual address segment included in the virtual address, where the base address information indicates the base address of the target physical address space segment where the physical address mapped to the virtual address is located; the offset information is found from the address segment attribute table according to the second virtual address segment included in the virtual address, where the offset information indicates the offset of the physical address mapped to the virtual address within the target physical address space segment; and then the physical address mapped to the virtual address is determined according to the base address information and the offset information. Because the address segment table and the address segment attribute table are found in parallel, and the address segment table and the address segment attribute table are found separately according to the first virtual address segment and the second virtual address segment, the lookup depth for the address segment table and the address segment attribute table can be reduced, and the time for finding the address segment table and the address segment attribute table is shortened, which can improve the efficiency of mapping virtual addresses to physical addresses.

In one embodiment, the address segment table corresponds to a plurality of processes including the current process, and different processes correspond to different address segment attribute tables.

The address segment table is used for recording a corresponding relationship between a virtual address segment and a physical address space segment. Different physical address space segments indicate different memory spaces, different memory spaces may be allocated to different processes for use, and different memory sub-spaces included in the same memory space may also be allocated to different processes for use, so the plurality of processes may share the same address segment table. For example, if the first virtual address segments in the virtual addresses to be accessed by process 1 and process 2 are the same, it indicates that two memory locations indicated by two physical addresses mapped to the virtual addresses to be accessed by process 1 and process 2 are within the memory space indicated by the physical address space segment corresponding to the first virtual address segment.

Notably, when there are a lot of processes, a plurality of address segment tables may be created, each address segment table corresponds to one or more processes, and different address segment tables correspond to different processes.

The address segment attribute table is used for recording a corresponding relationship between a virtual address segment and an offset within a physical address space segment. The second virtual address segments in the virtual addresses to be accessed by different processes may be the same, but the offsets within the physical address space segment indicated by the second virtual address segment in the virtual addresses to be accessed by different processes may be different. Therefore, different address segment attribute tables are built for different processes. For example, the first virtual address segments are different and the second virtual address segments are the same in the virtual addresses to be accessed by process 1 and process 2, the physical address mapped to the virtual address to be accessed by process 1 is located in physical address space segment 1, the physical address mapped to the virtual address to be accessed by process 2 is located in physical address space segment 2, the offset of the physical address mapped to the virtual address to be accessed by process 1 within physical address space segment 1 is the first offset, and the offset of the physical address mapped to the virtual address to be accessed by process 2 within physical address space segment 2 is the second offset, where the first offset is different from the second offset. If process 1 and process 2 share the same address segment attribute table, corresponding offset information cannot be found from the address segment attribute table according to the second virtual address segment, that is, the same second virtual address segment may correspond to different offsets within the physical address space segment.

In the embodiments of the present disclosure, the address segment table may be shared by a plurality of processes, thereby reducing the storage space occupied by the address segment table. Building different address segment attribute tables for different processes ensure that a physical address mapped to a virtual address to be accessed by a process can be accurately determined through the address segment table and the address segment attribute table. The physical address mapped to the virtual address is determined by looking up the address segment table and the address segment attribute table. Because the address segment table and the address segment attribute table may be looked up in parallel, the efficiency of table lookup can be improved. Moreover, the lookup depth for the address segment table and the address segment attribute table is relatively small, which can improve the efficiency of mapping virtual addresses to physical addresses.

In some embodiments, the target physical address space segment includes a plurality of physical address space sub-segments, which are sequentially adjacent and do not overlap. The physical address mapped to the virtual address is located in a target physical address space sub-segment among the plurality of physical address space sub-segments, and the offset information may indicate the offset of a base address of the target physical address space sub-segment relative to the base address of the target physical space segment.

Figure 3:
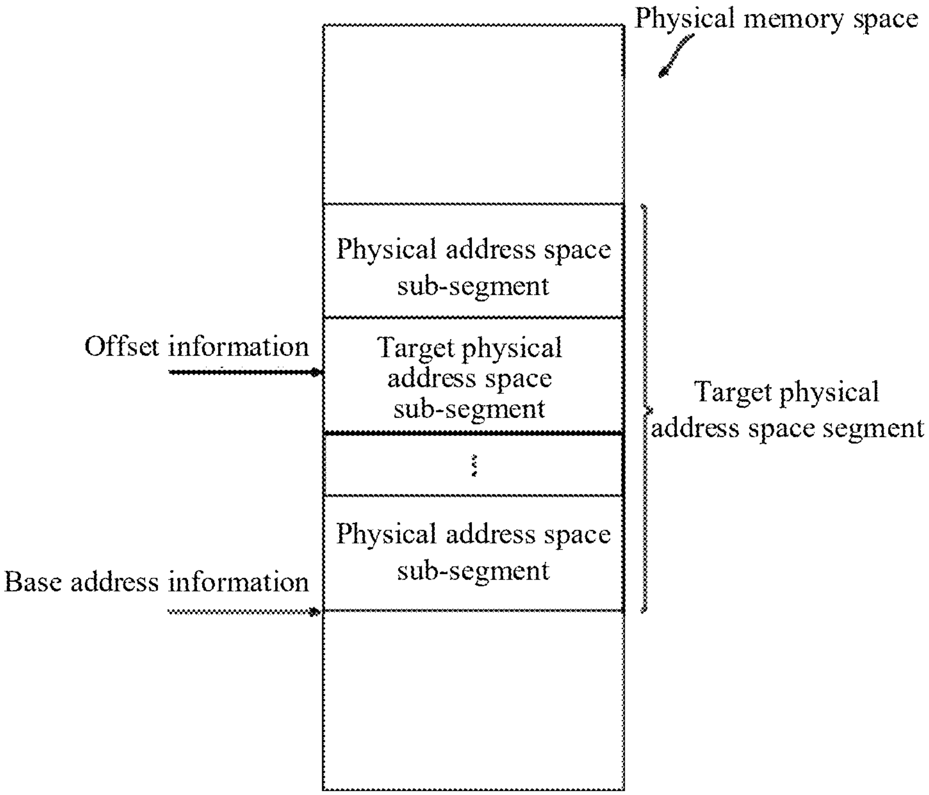
FIG. 3 is a schematic diagram of a physical memory space according to an embodiment of the present disclosure.

FIG. 3 illustrates a schematic diagram of a physical memory space according to an embodiment of the present disclosure. As shown in FIG. 3, a target physical address space segment includes a plurality of physical address space sub-segments that are sequentially adjacent and do not overlap. The target physical address space segment may indicate a continuous memory space, a physical address space sub-segment may indicate a continuous memory sub-space in this continuous memory space, and different physical address space sub-segments indicate different memory sub-spaces. Base address information is used for indicating a base address of the target physical address space segment, and offset information is used for indicating an offset of a base address of a target physical address space sub-segment relative to the base address of the target physical address space segment.

It may be determined according to the base address information that a physical address mapped to a virtual address is located within the target physical address space segment, that is, high bits of the physical address mapped to the virtual address may be determined according to the base address information. It may be determined according to the offset information that the physical address mapped to the virtual address is located within the target physical address space sub-segment, that is, high bits of an offset address value of the physical address mapped to the virtual address within the target physical address space segment may be determined according to the offset information. An offset address value of the physical address mapped to the virtual address within the target physical address space sub-segment, namely, low bits of the offset address value of the physical address mapped to the virtual address within the target physical address space segment, may be determined according to low bits prior to a second virtual address segment in the virtual address. Then, the physical address mapped to the virtual address may be completely determined according to the base address information, the offset information, and the low bits prior to the second virtual address segment in the virtual address.

In one example, the low bits prior to the second virtual address segment in the virtual address are defined as a third virtual address segment. Then, the first virtual address segment, the second virtual address segment, and the third virtual address segment are sequentially adjacent in the virtual address, and the third virtual address segment is located at the low bits of the virtual address. When the physical address mapped to the virtual address is determined, the base address information is added to the offset information to obtain the base address of the target physical address space sub-segment, and then the base address of the target physical address space sub-segment is added to the third virtual address segment to obtain the physical address mapped to the virtual address.

In the embodiment of the present disclosure, the target physical address space segment where the physical address mapped to the virtual address is located may be determined according to the base address information, the offset value of the target physical address space sub-segment where the physical address mapped to the virtual address is located within the target physical address space segment may be determined according to the offset information, the offset value of the physical address mapped to the virtual address within the target physical address space sub-segment may be determined according to the third virtual address segment, and then the base address information, the offset information, and the third virtual address segment are added to completely determine the physical address mapped to the virtual address, making the calculation of the determination process of the physical address simple and ensuring the correctness of the determined physical address.

In some embodiments, the address segment table may be of a linear list structure or a radix tree structure, and the address segment attribute table may be of a linear list structure or a radix tree structure.

The data structure of the address segment table may be a linear list structure or a radix tree structure according to the scale of the address segment table. The scale of the address segment table is related to the size of a physical address space (bit width of effective physical address) and segment granularity (SG). The segment granularity is used for characterizing the size of a memory space indicated by the physical address space segment. The segment granularity may be 32 MB, 64 MB, 128 MB, 256 MB, 1 GB, 4 GB, 8 GB, or the like, where MB represents megabytes and GB represents gigabytes. When the physical address space is large and the segment granularity is small, the physical address space is divided into a large number of physical address space segments, the scale of the address segment table is large, and the address segment table may adopt a radix tree structure. When the physical address space is small and the segment granularity is large, the physical address space is divided into a small number of physical address space segments, the scale of the address segment table is small, and the address segment table may adopt a linear list structure.

The data structure of the address segment attribute table may be a linear list structure or a radix tree structure according to the scale of the address segment attribute table. The scale of the address segment attribute table is related to the size of a physical address space segment and segment attribute granularity (SAG). The segment attribute granularity is used for characterizing the size of a memory sub space indicated by the physical address space sub-segment. The segment attribute granularity may be 4 KB, 8 KB, 16 KB, 32 KB, 64 KB, 2 MB, or the like, where KB represents kilobytes. When the physical address space segment is large and the segment attribute granularity is small, the physical address space segment includes a large number of physical address space sub-segments, the scale of the address segment attribute table is large, and the address segment attribute table may adopt a radix tree structure. When the physical address space segment is small and the segment attribute granularity is large, the physical address space segment includes a small number of physical address space sub-segments, the scale of the address segment attribute table is small, and the address segment attribute table may adopt a linear list structure.

When the segment granularity is small (such as 512 MB), the data structure of the address segment attribute table may be a linear list structure, and the number of bits included in entries of the address segment attribute table may be reduced to a few bits, which can accelerate the lookup of the address segment attribute table and reduce the resource overhead of the address segment attribute table.

The segment granularity and the segment attribute granularity may be configured by system software (such as operating system or virtual machine management software), and the segment granularity is far greater than the segment attribute granularity. For example, the segment attribute granularity may be 4 KB or 16 KB when the segment granularity is 4 GB, and the segment attribute granularity may be 4 KB or 16 KB when the segment granularity is 1 GB.

It should be noted that the data structures of the address segment table and the address segment attribute table may be the same or different. The embodiments of the present disclosure do not limit whether the data structures of the address segment table and the address segment attribute table are the same.

In the embodiments of the present disclosure, the data structure of the address segment table may be a linear list structure or a radix tree structure according to the scale of the address segment table, and the data structure of the address segment attribute table may be a linear list structure or a radix tree structure according to the scale of the address segment attribute table. For example, which data structure can improve the efficiency of table lookup, the address segment table and the address segment attribute table adopts which data structure, thereby shortening the time for looking up the address segment table and the address segment attribute table, and improving the efficiency of mapping physical addresses to physical addresses.

In some embodiments, when the data structure of the address segment table is a radix tree structure, the address segment table includes at least two segment table levels including a highest (first) segment table level and a lowest (last) segment table level. The highest segment table level among the at least two segment table levels includes one address segment sub-table, the non-highest segment table level among the at least two segment table levels includes a plurality of address segment sub-tables, and the address segment sub-table includes a plurality of entries.

Figure 4:
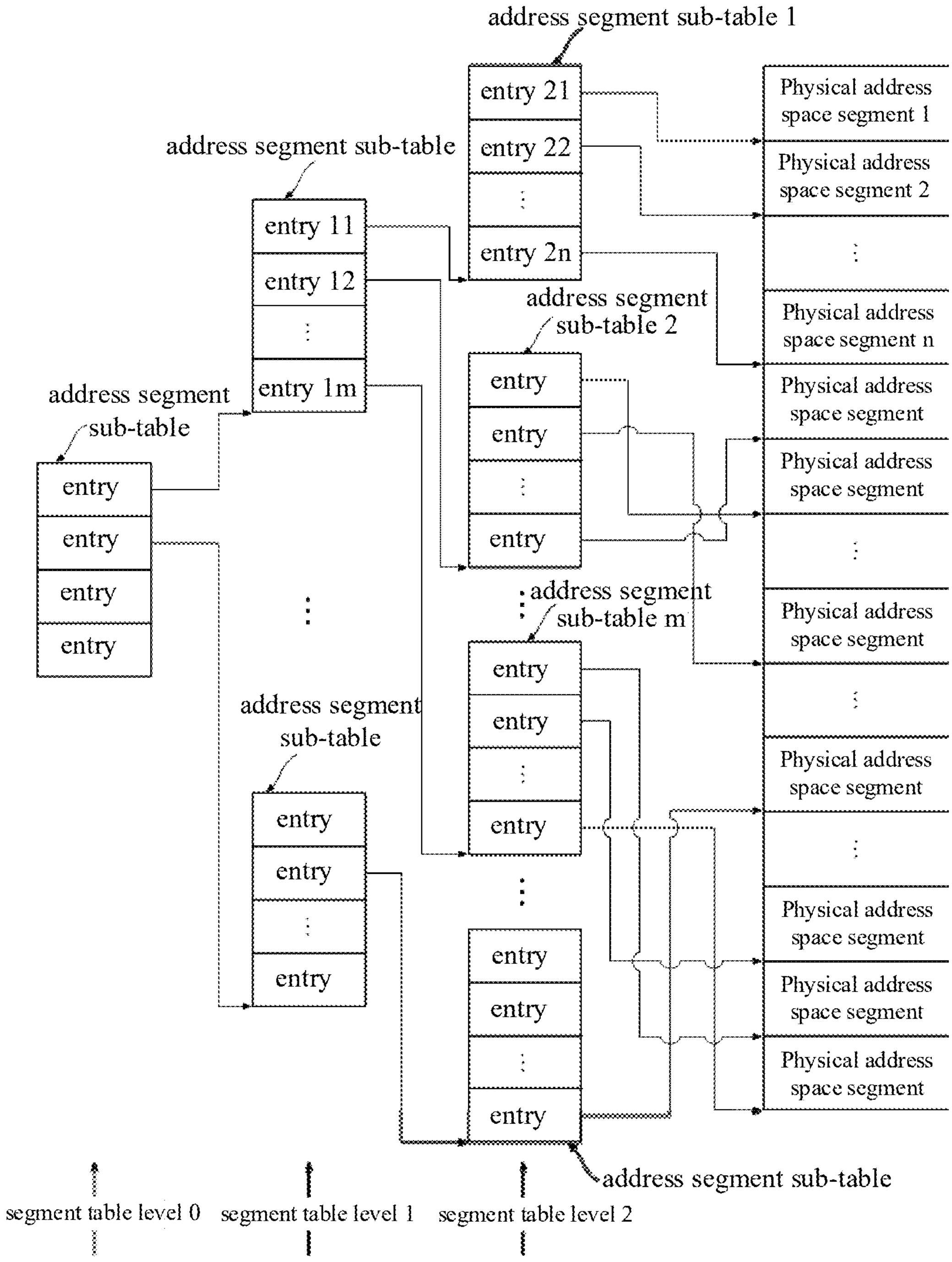
FIG. 4 is a schematic diagram of an address segment table according to an embodiment of the present disclosure.

FIG. 4 is a schematic diagram of an address segment table according to an embodiment of the present disclosure. As shown in FIG. 4, the address segment table includes a segment table level 0, a segment table level 1, and a segment table level 2. Segment table level 0 is the highest segment table level, and segment table level 2 is the lowest segment table level. Segment table level 0 includes 1 address segment sub-table, while both segment table level 1 and segment table level 2 include a plurality of address segment sub-tables. The address segment sub-table at segment table level 0 includes 4 entries.

It should be noted that the address segment table shown in FIG. 4 is an example of the address segment table in the embodiments of the present disclosure. In other embodiments, the quantity of address segment table levels included in the address segment table, the quantity of address segment sub-tables included in an address segment table level, and the quantity of entries included in an address segment sub-table may be any suitable values.

Among the at least two segment table levels included in the address segment table, different entries located at the lowest segment table level correspond to different physical address space segments, and an entry located at the lowest segment table level is used for storing at least a base address of the physical address space segment corresponding to the entry. Because different entries located at the lowest segment table level are used for storing the base addresses of different physical address space segments, the quantity of entries in the lowest segment table level is equal to the quantity of physical address space segments that the address segment table can indicate. It should be understood that the entries located at the lowest segment table level refer to entries included in the address segment sub-tables located at the last segment table level.

As shown in FIG. 4, segment table level 2 is the lowest segment table level, an entry located at segment table level 2 is used for storing at least a base address of a physical address space segment corresponding to the entry, and different entries located at segment table level 2 store the base addresses of different physical address space segments. For example, entry 21, entry 22, and entry 2n are all located at segment table level 2, entry 21 is used for storing a base address of physical address space segment 1, entry 22 is used for storing a base address of physical address space segment 2, and entry 2n is used for storing a base address of physical address space segment n.

It should be noted that an entry located at the lowest segment table level may store attribute information of a physical address space segment in addition to the base address of the physical address space segment.

Among the at least two segment table levels included in the address segment table, an entry located at the non-lowest segment table level is used for storing a base address of the address segment sub-table in the next segment table level, and the address segment sub-table corresponds to the entry in the non-lowest segment table level. Different entries located at the same non-lowest segment table level correspond to different address segment sub-tables in the next segment table level. Because different entries located at the same non-lowest segment table level correspond to different address segment sub-tables in the next segment table level, the quantity of entries included in a non-lowest segment table level is equal to the quantity of address segment sub-tables included in the next segment table level.

As shown in FIG. 4, segment table level 1 is a non-lowest segment table level, and segment table level 2 is the next level of segment table level 1. Entry 11, entry 12, and entry 1m are all located at segment table level 1. Address segment sub-table 1, address segment sub-table 2, and address segment sub-table m are all located at segment table level 2. Entry 11 is used for storing a base address of address segment sub-table 1, entry 12 is used for storing a base address of address segment sub-table 2, and entry 1m is used for storing a base address of address segment sub-table m.

In the embodiments of the present disclosure, an entry located at the lowest segment table level is used for storing a base address of a corresponding physical address space segment, and an entry located at the non-lowest segment table level is used for storing a base address of a corresponding address segment sub-table in the next segment table level. The entries, in these segment table levels, corresponding to the first virtual address segment may be found from in order from the highest segment table level to the lowest segment table level according to the first virtual address segment. After a corresponding entry is found from the lowest segment table level, base address information is read from the entry. This ensures that the base address information can be accurately and quickly found according to the first virtual address segment, thereby ensuring the accuracy and efficiency of mapping virtual addresses to physical addresses.

In some embodiments, when the data structure of the address segment table is a radix tree, the virtual address sub-segment, corresponding to the $i^{th}$ segment table level, in the first virtual address segment may be shifted to the left by n bits and then added to the base address of the $i^{th}$ address segment sub-table to obtain an $i^{th}$ segment table entry address, and a base address of the $(i+1)^{th}$ address segment sub-table stored in the entry pointed to by the $i^{th}$ segment table entry address in the $i^{th}$ address segment sub-table may be further obtained, where i is a positive integer less than N, N is equal to the quantity of the segment table levels, the base address of the $1^{st}$ address segment sub-table is a physical base address of the address segment table, and the data length of the entry located at the non-lowest segment table level in the address segment table is $2^n$ bytes.

Because the data length of the entry located at the non-lowest segment table level in the address segment table is $2^n$ bytes, the value obtained by shifting the virtual address sub-segment corresponding to the $i^{th}$ segment table level in the first virtual address segment to the left by n bits may indicate the offset of the entry corresponding to the virtual address sub-segment in the $i^{th}$ address segment sub-table. Then, this value is added to the base address of the $i^{th}$ address segment sub-table to obtain a physical address of the entry corresponding to the virtual address sub-segment in the $i^{th}$ address segment sub-table, that is, an $i^{th}$ segment table entry address.

After the base address of the $N^{th}$ address segment sub-table is obtained, the virtual address sub-segment corresponding to the $N^{th}$ segment table level in the first virtual address segment is shifted to the left by n bits and then added to the base address of the $N^{th}$ address segment sub-table to obtain an $N^{th}$ segment table entry address, and a base address stored in the entry pointed to by the $N^{th}$ segment table entry address in the $N^{th}$ address segment sub-table may be further obtained and determined as the base address information.

The value obtained by shifting the virtual address sub-segment corresponding to the $N^{th}$ segment table level in the first virtual address segment to the left by n bits may indicate the offset of the entry corresponding to the virtual address sub-segment in the $N^{th}$ address segment sub-table. Then, this value is added to the base address of the $N^{th}$ address segment sub-table to obtain a physical address of the entry corresponding to the virtual address sub-segment in the $N^{th}$ address segment sub-table, that is, an $N^{th}$ segment table entry address. The entry located at the $N^{th}$ segment table level stores the base address of the physical address space segment, then a base address of the target physical address space segment may be read from the entry pointed to by the $N^{th}$ segment table entry address, and this base address is used as base address information.

The data length of the entry located at the non-lowest segment table level in the address segment table may be determined according to the number of effective system physical address bits. For example, when the effective system physical address bits are 48 bits or 52 bits, the data length of the entry in the address segment table may be 64 bits. The data length of the entry located at the lowest segment table level in the address segment table may be equal to the data length of the entry located at the non-lowest segment table level. For example, the data lengths of entries located at different segment table levels in the address segment table are all 64 bits. When the segment granularity of the address segment table is large, such as 4G, or when the number of effective system physical address bits is small, the data length of the entry located at the lowest segment table level may be less than that of the entry located at the non-lowest segment table level. For example, the data length of the entry located at the non-lowest segment table level is 64 bits, while the data length of the entry located at the lowest segment table level is 32 bits, which can reduce the storage space occupied by the address segment table.

The location of the first virtual address segment in the virtual address is related to the number of bits of the effective system physical address and segment granularity. For example, when the effective system valid physical address is 52 bits and the segment granularity is 4 GB, the first virtual address segment is 32 to 52 bits in the virtual address. W when the effective system physical address is 52 bits and the segment granularity is 1 GB, the first virtual address segment is 30 to 52 bits in the virtual address.

The space size of the address segment sub-table is related to the number of entries included in the address segment sub-table and the data length of the entries, and the number of bits in the first virtual address segment corresponding to the virtual address sub-segment at each segment table level is related to the number of entries included in the address segment sub-table.

Figure 5:
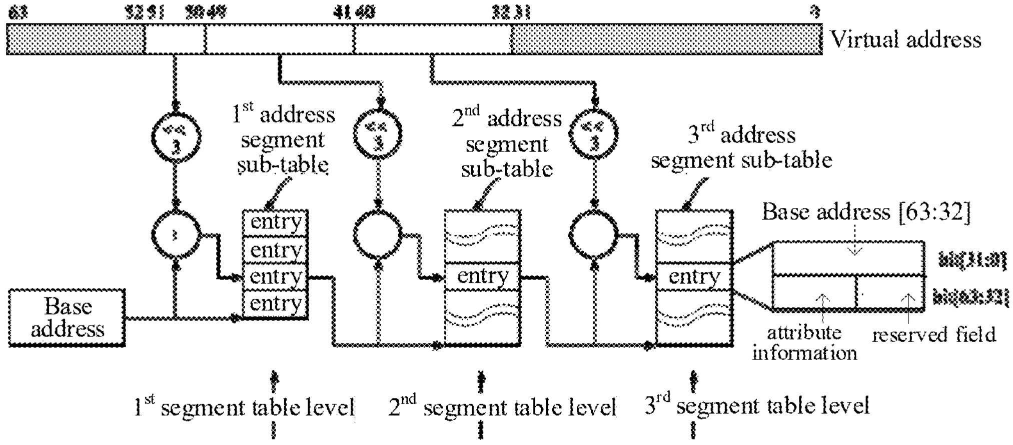
FIG. 5 is a schematic diagram showing look up process of an address segment table according to an embodiment of the present disclosure.

FIG. 5 is a schematic diagram showing lookup method of an address segment table according to an embodiment of the present disclosure. As shown in FIG. 5, the effective system physical address is 52 bits, the segment granularity is 4 GB, the address segment sub-table is 4 KB, and when the data length of an entry in the address segment table is 64 bits, the address segment sub-table at the non-highest address segment level includes 512 entries. The virtual address sub-segment corresponding to the 1$^{st}$ segment table level is 50 to 51 bits in the first virtual address segment, the virtual address sub-segment corresponding to the 2$^{nd}$ segment table level is 41 to 49 bits in the first virtual address segment, the virtual address sub-segment corresponding to the 3$^{rd}$ segment table level is 32 to 40 bits in the first virtual address segment, and the 3$^{rd}$ segment table level is the last segment table level. The 1$^{st}$ segment table level includes 1 address segment sub-table, which includes 4 entries. The 2$^{nd}$ segment table level includes 4 address segment sub-tables, each of which includes 512 entries. The 3$^{rd}$ segment table level includes $2^{11}$ address segment sub-tables, each of which includes 512 entries.

Figure 6:
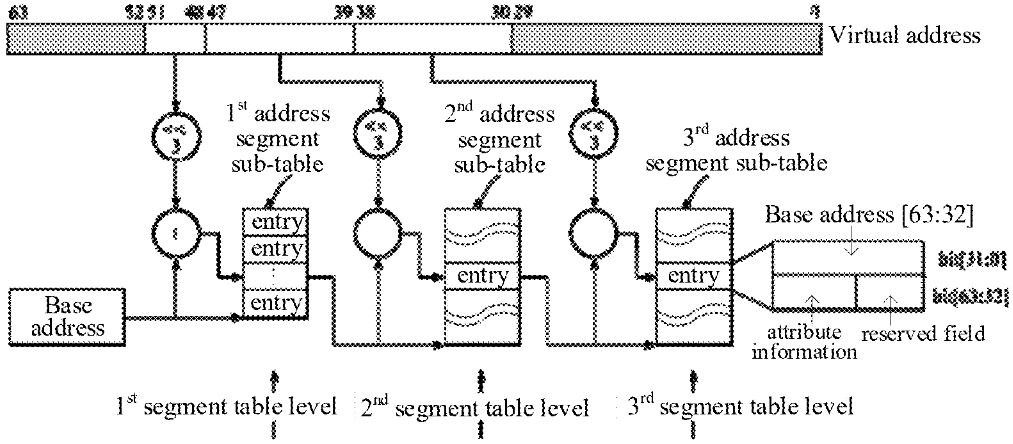
FIG. 6 is a schematic diagram showing look up process of an address segment table according to another embodiment of the present disclosure.

FIG. 6 is a schematic diagram showing lookup method of an address segment table according to another embodiment of the present disclosure. As shown in FIG. 6, the effective system physical address is 52 bits, the segment granularity is 1 GB, the address segment sub-table is 4 KB. When the data length of an entry is 64 bits, the address segment sub-table at the non-highest address segment level includes 512 entries. The virtual address sub-segment corresponding to the 1$^{st}$ segment table level is 48 to 51 bits in the first virtual address segment, the virtual address sub-segment corresponding to the 2$^{nd}$ segment table level is 39 to 47 bits in the first virtual address segment, the virtual address sub-segment corresponding to the 3$^{rd}$ segment table level is 30 to 38 bits in the first virtual address segment, and the 3$^{rd}$ segment table level is the lowest segment table level. The 1$^{st}$ segment table level includes 1 address segment sub-tables, which includes 16 entries. The 2$^{nd}$ segment table level includes 16 address segment sub-tables, each of which includes 512 entries. The 3rd segment table level includes $2^{13}$ address segment sub-tables, each of which includes 512 entries.

As shown in FIG. 5, because the segment granularity is 4 GB, the low 32 bits of the virtual address do not participate in the lookup of the address segment table. After the 50 to 51 bits in the virtual address are shifted to the left by 3 bits, the bits are added to the base address of the address segment table to obtain a 1$^{st}$ segment table entry address, and then a base address of the 2$^{nd}$ address segment sub-table may be read from the entry pointed to by the 1$^{st}$ segment table entry address in the 1$^{st}$ address segment sub-table, where the 1$^{st}$ address segment sub-table is located at the 1$^{st}$ segment table level, and the 2$^{nd}$ address segment sub-table is located at the 2$^{nd}$ segment table level. After the 41 to 49 bits in the virtual address are shifted to the left by 3 bits, the bits are added to the base address of the 2$^{nd}$ address segment sub-table to obtain a 2$^{nd}$ segment table entry address, and then a base address of the 3$^{rd}$ address segment sub-table may be read from the entry pointed to by the 2$^{nd}$ segment table entry address in the 2$^{nd}$ address segment sub-table, where the 3$^{rd}$ address segment sub-table is located at the 3$^{rd}$ segment table level. After the 32 to 40 bits in the virtual address are shifted to the left by 3 bits, the bits are added to the base address of the 3$^{rd}$ address segment sub-table to obtain a 3$^{rd}$ segment table entry address, then a base address of the physical address space segment may be read from the entry pointed to by the 3$^{rd}$ segment table entry address in the 3$^{rd}$ address segment sub-table, and the read base address is used as base address information.

As shown in FIG. 6, because the segment granularity is 1 GB, the low 30 bits of the virtual address do not participate in the lookup of the address segment table. After the 48 to 51 bits in the virtual address are shifted to the left by 3 bits, the bits are added to the base address of the address segment table to obtain a 1$^{st}$ segment table entry address, and then a base address of the 2$^{nd}$ address segment sub-table may be read from the entry pointed to by the 1$^{st}$ segment table entry address in the 1$^{st}$ address segment sub-table, where the 1$^{st}$ address segment sub-table is located at the 1$^{st}$ segment table level, and the 2$^{nd}$ address segment sub-table is located at the 2$^{nd}$ segment table level. After the 39 to 47 bits in the virtual address are shifted to the left by 3 bits, the bits are added to the base address of the 2$^{nd}$ address segment sub-table to obtain a 2$^{nd}$ segment table entry address, and then a base address of the 3$^{rd}$ address segment sub-table may be read from the entry pointed to by the 2$^{nd}$ segment table entry address in the 2$^{nd}$ address segment sub-table, where the 3$^{rd}$ address segment sub-table is located at the 3$^{rd}$ segment table level. After the 30 to 38 bits in the virtual address are shifted to the left by 3 bits, the bits are added to the base address of the 3$^{rd}$ address segment sub-table to obtain a 3$^{rd}$ segment table entry address, then a base address of the physical address space segment may be read from the entry pointed to by the 3$^{rd}$ segment table entry address in the 3$^{rd}$ address segment sub-table, and the read base address is used as base address information.

It should be noted that the base address of the physical address space segment stored in the entry located at the lowest address segment level may be the high bits of a physical base address of the corresponding physical address space segment. As shown in FIG. 5 and FIG. 6, the 0 to 31 bits of the entry in the 3$^{rd}$ address segment sub-table store 32 to 63 bits of the physical base address of the corresponding physical address space segment. The entry located at the lowest address segment level may also store attribute information of the corresponding physical address space segment in addition to the base address of the physical address space segment. In addition, the entry located at the lowest address segment level may further include a reserved field. As shown in FIG. 5 and FIG. 6, the 32 to 63 bits of the entry in the $3^{rd}$ address segment sub-table store the attribute information and reserved field of the physical address space segment.

Notably, in the foregoing embodiments and subsequent embodiments, bit refers to the bit in binary number or the unit of information.

The entry located at the non-last segment table level also stores segment table level information and the like in addition to the base address of the address segment sub-table corresponding to the entry in the next segment table level, where the segment table level information is used for indicating whether the entry is located at the lowest segment table level.

In the embodiment of the present disclosure, the first virtual address segment includes virtual address sub-segments corresponding to different segment table levels. By shifting a virtual address sub-segment to the left and then adding the shifted virtual address sub-segment to the base address of the corresponding address segment sub-table, an entry in the address segment sub-table may be located. The entry located at the non-lowest segment table level stores the base address of an entry in the next segment table level, and then the entry in the next segment table level may be further located. In this way, an entry located at the lowest segment table level is located, and the base address stored in the entry is read out and taken as base address information, so that the lookup depth for the address segment table is reduced, thereby ensuring that the base address information can be quickly found according to the first virtual address segment.

In some embodiments, when the address segment attribute table is of a radix tree structure, the address segment attribute table includes at least two attribute table levels, the highest (first) attribute table level among the at least two attribute table levels includes one attribute sub-table, the non-highest attribute table level among the at least two attribute table levels includes a plurality of attribute sub-tables, and the attribute sub-table includes a plurality of entries.

Figure 7:
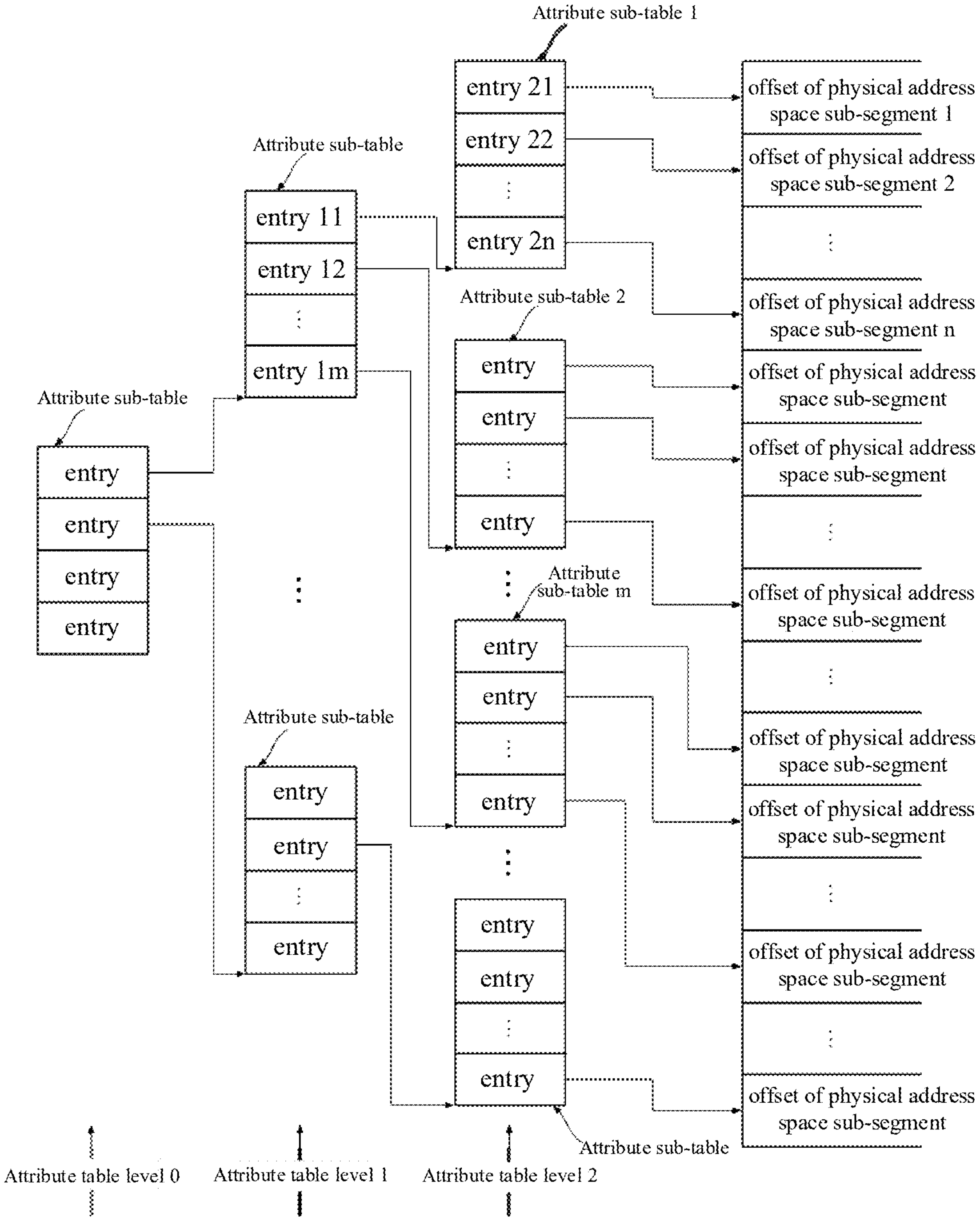
FIG. 7 is a schematic diagram of an address segment attribute table according to an embodiment of the present disclosure.

FIG. 7 is a schematic diagram of an address segment attribute table according to an embodiment of the present disclosure. As shown in FIG. 7, the address segment attribute table includes attribute table level 0, attribute table level 1, and attribute table level 2, where attribute table level 0 is the highest (first) attribute table level, and attribute table level 2 is the lowest (last) attribute table level. Attribute table level 0 includes 1 attribute sub-table, while attribute table level 1 and attribute table level 2 both include a plurality of attribute sub-tables. The attribute sub-table at attribute table level 0 includes 4 entries.

It should be noted that the address segment attribute table shown in FIG. 7 is an example of the address segment attribute table in the embodiments of the present disclosure. In other embodiments, the quantity of attribute table levels included in the address segment attribute table, the quantity of attribute sub-tables included in an attribute table level, and the quantity of entries included in an attribute sub-tables may be any suitable values.

Among the at least two attribute table levels included in the address segment attribute table, different entries located at the lowest attribute table level correspond to different physical address space sub-segments, and the entry located at the lowest attribute table level is used for storing at least an offset of the base address of the physical address space sub-segment corresponding to the entry relative to the base address of the physical address space segment where the physical address space sub-segment is located. Because different entries located at the lowest attribute table level are used for storing the offsets of different physical address space sub-segments, the quantity of entries located at the lowest attribute table level is equal to the quantity of physical address space sub-segments that the address segment attribute table can indicate. It should be understood that the entries located at the lowest attribute table level refer to entries included in the attribute sub-tables located at the lowest attribute table level.

As shown in FIG. 7, attribute table level 2 is the lowest attribute table level, an entry located at attribute table level 2 is used for storing at least an offset of the physical address space sub-segment corresponding to the entry, and different entries located at attribute table level 2 store the offsets of different physical address space sub-segments. For example, entry 21, entry 22, and entry 2n are all located at attribute table level 2, entry 21 is used for storing an offset of a base address of physical address space sub-segment 1 relative to a base address of a physical address space segment where physical address space sub-segment 1 is located, entry 22 is used for storing an offset of a base address of physical address space sub-segment 2 relative to the base address of the physical address space segment where physical address space sub-segment 2 is located, and entry 2n is used for storing an offset of a base address of physical address space sub-segment n relative to the base address of the physical address space segment where physical address space sub-segment n is located.

It should be noted that an entry located at the lowest attribute table level may store attribute information of a physical address space sub-segment in addition to the offset of the physical address space sub-segment. The attribute information of a physical address space sub-segment includes a read and write permission and a security attribute of the physical address space sub-segment, whether the physical address space sub-segment has been written, and the like. The entry located at the lowest attribute table level may further include a reserved field.

Among the at least two attribute table levels included in the address segment attribute table, an entry located at the non-lowest attribute table level is used for storing a base address of the attribute sub-table in the next attribute table level, and the attribute sub-table corresponds to this entry in the non-lowest attribute table level. Different entries located at the same non-lowest attribute table level correspond to different attribute sub-tables in the next attribute table level. Because different entries located at the same non-lowest attribute table level correspond to different attribute sub-tables in the next attribute table level, the quantity of entries included in a non-lowest attribute table level is equal to the quantity of attribute sub-tables included in the next attribute table level.

As shown in FIG. 7, attribute table level 1 is a non-lowest attribute table level, and attribute table level 2 is the next attribute table level of attribute table level 1. Entry 11, entry 12, and entry 1m are all located at attribute table level 1; attribute sub-tables 1, attribute sub-tables 2, and attribute sub-tables m are all located at attribute table level 2; entry 11 is used for storing a base address of attribute sub-tables 1, entry 12 is used for storing a base address of attribute sub-tables 2, and entry 1m is used for storing a base address of attribute sub-tables m.

In the embodiments of the present disclosure, an entry located at the lowest attribute table level is used for storing an offset of a physical address space sub-segment corresponding to this entry, and an entry located at the non-lowest attribute table level is used for storing a base address of a attribute sub-table, corresponding to this entry, in the next attribute table level. Corresponding entries may be found from these attribute table levels in order from the highest attribute table level to the lowest attribute table level according to a second virtual address segment. After a corresponding entry is found from the lowest attribute table level, offset information is read from the entry. This ensures that the offset information can be accurately and quickly found according to the second virtual address segment, thereby ensuring the accuracy and efficiency of mapping virtual addresses to physical addresses.

In some embodiments, when the data structure of the address segment attribute table is a radix tree, the virtual address sub-segment corresponding to the $j^{th}$ attribute table level in the second virtual address segment may be shifted to the left by m bits and then added to the base address of the $j^{th}$ attribute sub-table to obtain a $j^{th}$ attribute table entry address, and a base address of the $(j+1)^{th}$ attribute sub-table stored in the entry pointed to by the $j^{th}$ attribute table entry address in the $j^{th}$ attribute sub-table may be further obtained, where j is less than M, M is equal to the quantity of the attribute table levels, the base address of the $1^{st}$ attribute sub-table is a physical base address of the address segment attribute table, and the data length of the entry located at the non-lowest attribute table level in the address segment attribute table is 2m bytes.

Because the data length of the entry located at the non-lowest attribute table level in the address segment attribute table is $2^m$ bytes, the value obtained by shifting the virtual address sub-segment corresponding to the $j^{th}$ attribute table level in the second virtual address segment to the left by m bits may indicate the offset of the entry corresponding to the virtual address sub-segment in the $j^{th}$ attribute sub-table. Then, this value is added to the base address of the $j^{th}$ attribute sub-table to obtain a physical address of the entry corresponding to the virtual address sub-segment in the $j^{th}$ attribute sub-table, that is, a $j^{th}$ attribute table entry address.

After the base address of the $M^{th}$ attribute sub-table is obtained, the virtual address sub-segment corresponding to the $M^{th}$ attribute table level in the second virtual address segment is shifted to the left by m bits and then added to the base address of the $M^{th}$ attribute sub-table to obtain an $M^{th}$ attribute table entry address, and an offset stored in the entry pointed to by the $M^{th}$ attribute table entry address in the $M^{th}$ attribute sub-table may be further obtained and determined as the offset information.

The value obtained by shifting the virtual address sub-segment corresponding to the $M^{th}$ attribute table level in the second virtual address segment to the left by m bits may indicate the offset of the entry corresponding to the virtual address sub-segment in the $M^{th}$ attribute sub-table. Then, this value is added to the base address of the $M^{th}$ attribute sub-table to obtain a physical address of the entry corresponding to the virtual address sub-segment in the $M^{th}$ attribute sub-table, that is, an $M^{th}$ attribute table entry address. The entry located at the $M^{th}$ attribute table level stores the offset of the physical address space sub-segment, then an offset of the target physical address space sub-segment may be read from the entry pointed to by the $M^{th}$ attribute table entry address, and the offset is used as offset information.

The data length of the entry located at the non-lowest attribute table level in the address segment attribute table may be determined according to the number of bits of the effective system physical address. For example, when the effective system physical address is 48 bits or 52 bits, the data length of the entry in the address segment attribute table may be 64 bits. The data length of the entry located at the lowest attribute table level in the address segment attribute table may be equal to the data length of the entry located at the non-lowest attribute table level. For example, the data lengths of entries located at different attribute table levels in the address segment attribute table are all 64 bits. When the segment attribute granularity of the address segment attribute table is large, or when the number of bits of the effective system physical address is small, the data length of the entry located at the lowest attribute table level may be less than that of the entry located at the non-lowest attribute table level. For example, the data length of the entry located at the non-lowest attribute table level is 64 bits, while the data length of the entry located at the lowest attribute table level is 32 bits, which can reduce the storage space occupied by the address segment attribute table.

The location of the second virtual address segment in the virtual address is related to the segment attribute granularity. For example, when the effective system physical address is 52 bits and the segment attribute granularity is 4 KB, the second virtual address segment is 21 to 31 bits in the virtual address. When the effective system physical address is 52 bits and the segment attribute granularity is 16 KB, the second virtual address segment is 14 to 29 bits in the virtual address.

The space size of the attribute sub-table is related to the number of entries included in the attribute sub-table and the data length of the entry. In the second virtual address segment, the number of bits of the virtual address sub-segment at each attribute table level is related to the number of entries included in the attribute sub-table.

Figure 8:
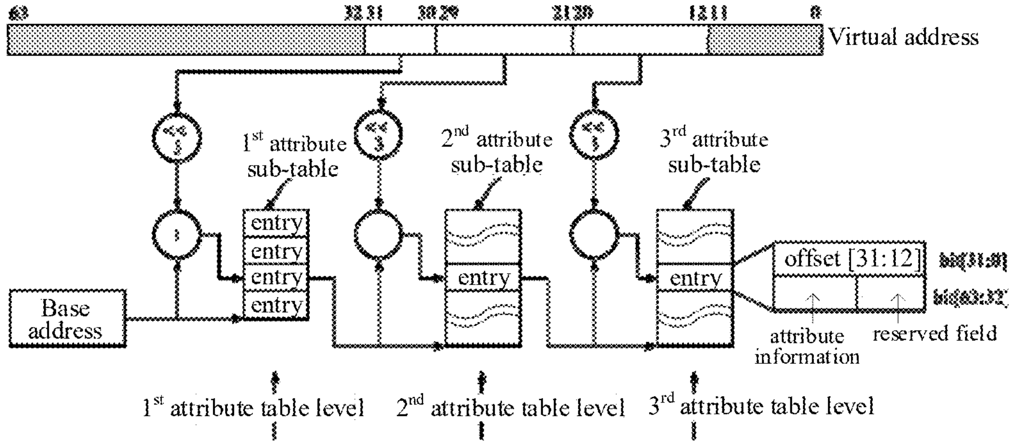
FIG. 8 is a schematic diagram showing look up process of an address segment attribute table according to an embodiment of the present disclosure.

FIG. 8 is a schematic diagram showing lookup process of an address segment attribute table according to an embodiment of the present disclosure. As shown in FIG. 8, the effective system physical address is 52 bits, the segment granularity is 4 GB, the segment attribute granularity is 4 KB, and the attribute sub-table is 4 KB. When the data length of an entry in the address segment attribute table is 64 bits, the attribute sub-table at the non-lowest attribute table level includes 512 entries. The virtual address sub-segment corresponding to the $1^{st}$ attribute table level is 30 to 31 bits in the second virtual address segment, the virtual address sub-segment corresponding to the $2^{nd}$ attribute table level is 21 to 29 bits in the second virtual address segment, and the virtual address sub-segment corresponding to the $3^{rd}$ attribute table level is 12 to 20 bits in the second virtual address segment. The $1^{st}$ attribute table level includes 1 attribute sub-table, which includes 4 entries. The $2^{nd}$ attribute table level includes 4 attribute sub-tables, each of which includes 512 entries. The $3^{rd}$ attribute table level includes $2^{11}$ attribute sub-tables, each of which includes 512 entries.

Figure 9:
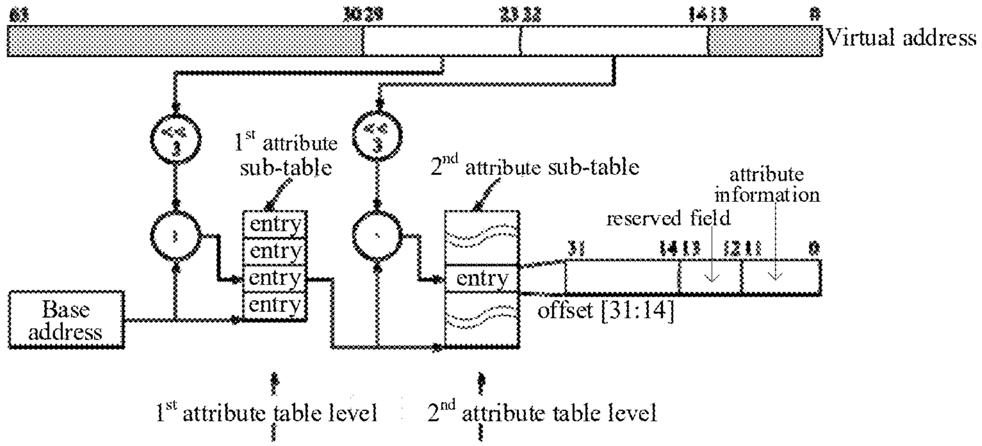
FIG. 9 is a schematic diagram showing look up process of an address segment attribute table according to another embodiment of the present disclosure.

FIG. 9 is a schematic diagram showing lookup process of an address segment attribute table according to another embodiment of the present disclosure. As shown in FIG. 9, the effective system physical address is 52 bits, the segment granularity is 1 GB, the segment attribute granularity is 16 KB, and the attribute sub-table is 4 KB. When the data length of an entry in the address segment attribute table is 64 bits, the attribute sub-table at the non-lowest attribute table level includes 512 entries. The virtual address sub-segment corresponding to the $1^{st}$ attribute table level is 23 to 29 bits in the second virtual address segment, and the virtual address sub-segment corresponding to the $2^{nd}$ attribute table level is 14 to 22 bits in the second virtual address segment.

The $1^{st}$ attribute table level includes 1 attribute sub-table, which includes 128 entries. The $2^{nd}$ attribute table level includes 128 attribute sub-tables, each of which includes 512 entries.

As shown in FIG. 8, because the segment attribute granularity is 4 KB, the low 12 bits of the virtual address do not participate in the lookup of the address segment attribute table. After the 30 to 31 bits in the virtual address are shifted to the left by 3 bits, the bits are added to the base address of the address segment attribute table to obtain a $1^{st}$ attribute table entry address, and then a base address of the $2^{nd}$ attribute sub-table may be read from the entry pointed to by the $1^{st}$ attribute table entry address in the $1^{st}$ attribute sub-table, where the $1^{st}$ attribute sub-table is located at the $1^{st}$ attribute table level, and the $2^{nd}$ attribute sub-table is located at the $2^{nd}$ attribute table level. After the 21 to 29 bits in the virtual address are shifted to the left by 3 bits, the bits are added to the base address of the $2^{nd}$ attribute sub-table to obtain a $2^{nd}$ attribute table entry address, and then a base address of the $3^{rd}$ attribute sub-table may be read from the entry pointed to by the $2^{nd}$ attribute table entry address in the $2^{nd}$ attribute sub-table, where the $3^{rd}$ attribute sub-table is located at the $3^{rd}$ attribute table level. After the 12 to 20 bits in the virtual address are shifted to the left by 3 bits, the bits are added to the base address of the $3^{rd}$ attribute sub-table to obtain a $3^{rd}$ attribute table entry address, then an offset of the physical address space sub-segment may be read from the entry pointed to by the $3^{rd}$ attribute table entry address in the $3^{rd}$ attribute sub-table, and the offset is used as offset information.

As shown in FIG. 9, because the segment attribute granularity is 16 KB, the low 14 bits of the virtual address do not participate in the lookup of the address segment attribute table. After the 23 to 29 bits in the virtual address are shifted to the left by 3 bits, the bits are added to the base address of the address segment attribute table to obtain a $1^{st}$ attribute table entry address, and then a base address of the $2^{nd}$ attribute sub-table may be read from the entry pointed to by the $1^{st}$ attribute table entry address in the $1^{st}$ attribute sub-table, where the $1^{st}$ attribute sub-table is located at the $1^{st}$ attribute table level, and the $2^{nd}$ attribute sub-table is located at the $2^{nd}$ attribute table level. After the 14 to 22 bits in the virtual address are shifted to the left by 3 bits, the bits are added to the base address of the $2^{nd}$ attribute sub-table to obtain a $2^{nd}$ attribute table entry address, then an offset of the physical address space sub-segment may be read from the entry pointed to by the $2^{nd}$ attribute table entry address in the $2^{nd}$ attribute sub-table, and the offset is used as offset information.

It should be noted that the offset of the physical address space sub-segment stored in the entry located at the lowest attribute table level may be the high bits of an offset address of the corresponding physical address space sub-segment. As shown in FIG. 8, the 0 to 31 bits of the entry in the $3^{rd}$ attribute sub-table store 12 to 31 bits of the offset address of the corresponding physical address space sub-segment. As shown in FIG. 9, the 14 to 31 bits of the entry in the $2^{nd}$ attribute sub-table store 14 to 31 bits of the offset address of the corresponding physical address space sub-segment. The entry located at the lowest attribute table level may also store attribute information of the corresponding physical address space sub-segment in addition to the offset address of the physical address space sub-segment. In addition, the entry located at the lowest attribute table level may further include a reserved field. As shown in FIG. 8, the 32 to 63 bits of the entry in the $3^{rd}$ attribute sub-table store the attribute information and reserved field of the physical address space sub-segment. As shown in FIG. 9, the 0 to 11 bits of the entry in the $2^{nd}$ attribute sub-table store the attribute information of the physical address space sub-segment, and the 12 to 13 bits are a reserved field.

The entry located at the non-lowest attribute table level also stores attribute table level information and the like in addition to the base address of the attribute sub-table corresponding to the entry in the next attribute table level, where the attribute table level information is used for indicating whether the entry is located at the lowest attribute table level.

In the embodiment of the present disclosure, the second virtual address segment includes virtual address sub-segments corresponding to different attribute table levels. By shifting a virtual address sub-segment to the left and then adding the shifted virtual address sub-segment to the base address of the corresponding attribute sub-table, an entry in the attribute sub-table may be determined. The entry located at the non-lowest attribute table level stores the base address of an entry in the next attribute table level, and then the entry in the next attribute table level may be further determined. In this way, the entry located at the lowest attribute table level is determined, and the offset stored in the entry is read out as offset information, so that the lookup depth for the address segment attribute table is reduced, thereby ensuring that the offset information can be quickly found according to the second virtual address segment.

In some embodiments, permission information may be found from the address segment attribute table according to the second virtual address segment. The permission information may indicate an access permission of the physical address mapped to the virtual address. The permission information and the corresponding offset information are stored in the same entry in the address segment attribute table.

After the permission information is found according to the second virtual address segment, it may be determined according to the permission information whether the current process has a permission to access the physical address mapped to the virtual address. If the current process has the permission to access the physical address mapped to the virtual address, the current process is allowed to access the physical address mapped to the virtual address, and then the physical address mapped to the virtual address is read and written. If the current process does not have the permission to access the physical address mapped to the virtual address, the current process is rejected to access the physical address mapped to the virtual address, and then no response is made to the current memory access request of the current process, or indication information for indicating memory access failure is returned to the current process.

Because the offset information stored in the address segment attribute table is used for indicating the offset of the physical address space sub-segment including continuous physical addresses, the address segment attribute information indicates an access permission to the physical address space sub-segment. If the permission information indicates that the current process has the access permission to the target physical address space sub-segment, the current process has the permission to access the physical address mapped to the virtual address. If the permission information indicates that the current process does not have the access permission to the target physical address space sub-segment, the current process does not have the permission to access the physical address mapped to the virtual address.

When the data structure of the address segment attribute table is a radix tree structure, the permission information is stored in the entry located at the lowest attribute table level, that is, the offset of the physical address space sub-segment and the permission information of the physical address space sub-segment are stored in the same entry. When the offset of the target physical address space sub-segment is found from the address segment attribute table according to the second virtual address segment, the permission information of the target physical address space sub-segment may be obtained simultaneously, and then whether the current process has the permission to access the physical address mapped to the virtual address may be determined according to the obtained permission information.

In one example, as shown in FIG. 8, the permission information is located at 32 to 63 bits of the entry in the $3^{rd}$ attribute sub-table. As shown in FIG. 9, the permission information is located at 0 to 11 bits of the entry in the $2^{nd}$ attribute sub-table.

In the embodiment of the present disclosure, the address segment attribute table stores permission information of physical address space sub-segment. When offset information is found from the address segment attribute table, the permission information of the target physical address space sub-segment may be synchronously found. Then, it may be determined according to the found permission information whether the current process has an access permission to the target physical address space sub-segment. If the current process has the access permission to the target physical address space sub-segment, the current process has a permission to access the physical address mapped to the virtual address. If the current process does not have the access permission to the target physical address space sub-segment, the current process does not have the permission to access the physical address mapped to the virtual address. The offset address of a physical address space sub-segment relative to the physical address space segment, and the access permission to the physical address space sub-segment, are stored in the address segment attribute table. When the offset address of the physical address space sub-segment is found, the permission information of the physical address space sub-segment may be synchronously obtained, which can enable different processes to have access permissions to different physical address space sub-segments included in the same physical address space segment, facilitate the management of process access permissions to the memory, and more flexibly allocate continuous memory spaces to different processes for use.

In some embodiments, the address segment table and the address segment attribute table corresponding to the current process may be determined separately according to the identification information of the current process.

When the address segment table corresponding to the current process is determined, address segment identity information corresponding to the current process may be found from a segment set list according to the identification information of the current process, then an address segment table base address corresponding to the current process may be found from a segment configuration list according to the address segment identity information corresponding to the current process, and an address segment table whose base address is the address segment table base address corresponding to the current process is determined as the address segment table corresponding to the current process.

The segment set list stores corresponding relationships between identification information of a plurality of processes and address segment identity information, and the same address segment identity information in the segment set list corresponds to the identification information of at least one process. That is, the identification information of different processes may correspond to the same address segment identity information, and the identification information of different processes is different.

The segment configuration list stores corresponding relationships between a plurality of pieces of address segment identity information and address segment table base addresses, different address segment identity information corresponds to different address segment table base addresses, and the base addresses of different address segment tables are different. That is, the quantity of the corresponding relationships between the address segment identity information and the address segment table base addresses stored in the segment configuration list is equal to the quantity of address segment tables.

In one example, the identification information of process 1 is identification information 1, the identification information of process 2 is identification information 2, and the identification information of process 3 is identification information 3, where identification information 1, identification information 2, and identification information 3 are different from each other. In the segment set list, identification information 1 and identification information 2 correspond to address segment identity information 1, identification information 3 corresponds to address segment identity information 2, and address segment identity information 1 is different from address segment identity information 2. Then, process 1 and process 2 correspond to the same address segment table, and process 3 corresponds to a different address segment table from process 1 (process 2).

The segment set list and the segment configuration list may be configured by system management software (such as an operating system) by programming. The segment configuration list may also store information such as segment granularities and global configuration attributes of the address segment tables indicated by the address segment table base addresses in addition to the address segment table base addresses corresponding to the address segment identity information.

In the embodiment of the present disclosure, because the same address segment table may be shared by multiple processes, address segment identity information corresponding to the identification information of a process may be found from the segment set list. The identification information of different processes may correspond to the same address segment identity information. An address segment table base address corresponding to the address segment identity information may be found from the segment configuration list, and then an address segment table corresponding to the process may be determined according to the address segment table base address. Because different processes may correspond to the same address segment table, an address segment table corresponding to a process can be conveniently determined according to the identification information of the process through the segment set list and the segment configuration list, and the data volume of the segment configuration list can be reduced.

In another embodiment, compared to the above embodiment, the segment set list may not be configured, and the base address of the corresponding address segment table is directly found from the segment configuration list through the identification information of the process. The segment configuration list stores corresponding relationships between a plurality of pieces of identification information and address segment table base addresses, different identification information corresponds to different address segment table base addresses, and different processes correspond to different identification information. After the identification information of the current process is obtained, a corresponding entry in the segment configuration list may be directly indexed according to the identification information of the current process, then an address segment table base address corresponding to the current process is obtained from the entry, and an address segment table whose base address is the address segment table base address corresponding to the current process is determined as the address segment table corresponding to the current process.

In another embodiment, the segment set list may be replaced with a mapping algorithm. The mapping algorithm may map the identification information of a process to corresponding address segment identity information. The mapping algorithm may map the identification information of different processes to the same address segment identity information.

When the address segment attribute table corresponding to the current process is determined, an attribute table base address corresponding to the current process may be found from an attribute configuration list according to the identification information of the current process, and then an address segment attribute table whose base address is the attribute table base address corresponding to the current process is determined as the address segment attribute table corresponding to the current process. The attribute configuration list stores corresponding relationships between identification information of a plurality of processes and attribute table base addresses, and different identification information corresponds to different attribute table base addresses.

The attribute configuration list stores corresponding relationships between a plurality of pieces of identification information and attribute table base addresses, different identification information corresponds to different attribute table base addresses, and the base addresses of different address segment attribute tables are different. That is, the quantity of the corresponding relationships between the identification information and the attribute table base addresses stored in the attribute configuration list is equal to the quantity of address segment attribute tables.

The attribute configuration list may be configured by system management software (such as an operating system) by programming. The attribute configuration list may also store information such as segment attribute granularities and global configuration attributes of the address segment attribute tables in addition to the attribute table base addresses corresponding to the identification information.

In the embodiment of the present disclosure, because different processes correspond to different address segment attribute tables, an attribute table base address corresponding to the identification information of a process may be obtained by looking up the attribute configuration list through the corresponding relationships between identification information of processes and attribute table base addresses recorded in the attribute configuration list, and an address segment attribute table whose base address is the same as the obtained attribute table base address is determined as the address segment attribute table corresponding to the process. Therefore, an address segment attribute table corresponding to a process can be quickly and accurately found.

Figure 10:
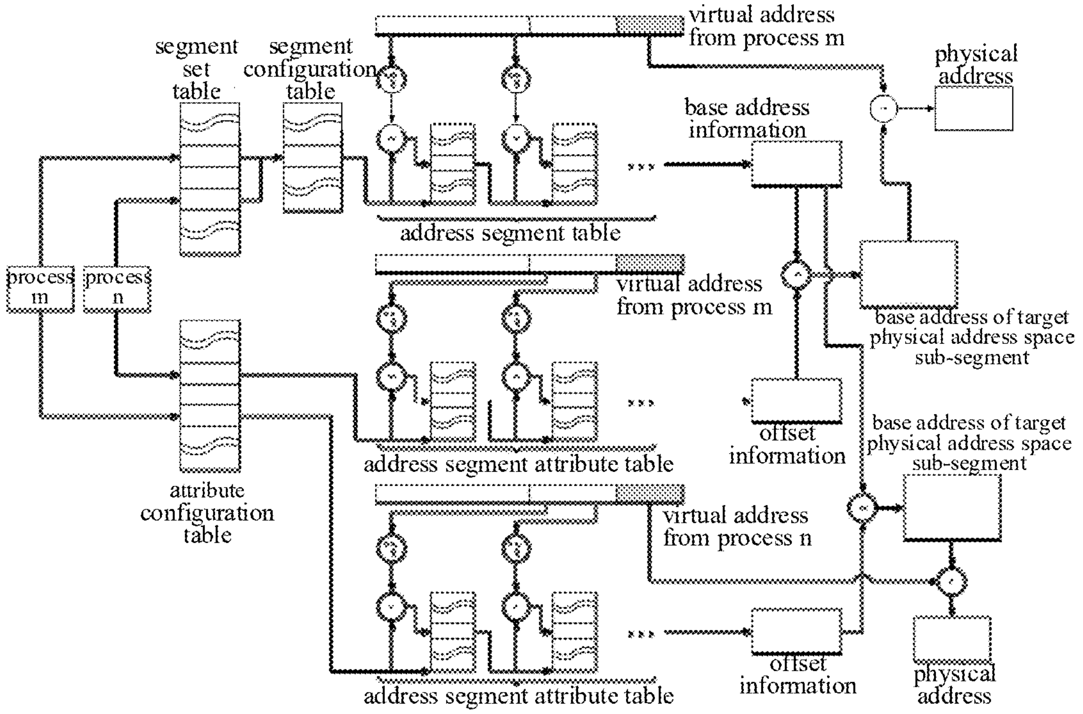
FIG. 10 is a schematic diagram showing look up process when a process accesses a memory table according to an embodiment of the present disclosure.

FIG. 10 is a schematic diagram showing look up process when a process accesses a memory table according to an embodiment of the present disclosure. As shown in FIG. 10, a memory access request of a process enters the memory management unit, and the memory access request includes identification information of the process and a virtual address to be accessed. The memory management unit access the segment set list and the attribute configuration list in parallel according to the identification information of the process. After address segment identity information corresponding to the identification information is found from the segment set list, an address segment table base address corresponding to the address segment identity information is found from the segment configuration list, and an attribute table base address corresponding to the identification information is found from the attribute configuration list. The segment set list, the segment configuration list, and the attribute configuration list may be stored locally.

After the address segment table base address is found, an address segment table corresponding to the process may be determined according to the address segment table base address, and then the address segment table is looked up according to a first virtual address segment included in the virtual address to obtain base address information. In the example shown in FIG. 10, process m and process n correspond to the same address segment table.

After the attribute table base address is found, an address segment attribute table corresponding to the process may be determined according to the attribute table base address, and then the address segment attribute table is looked up according to a second virtual address segment included in the virtual address to obtain offset information. As shown in FIG. 10, process m and process n correspond to different address segment attribute tables. When the address segment attribute table is looked up according to the second virtual address segment, permission information of a target physical address space sub-segment may also be obtained.

After the address segment table and the address segment attribute table are looked up to obtain the base address information, the offset information and the permission information, the base address information, the offset information and low bits of the virtual address are added to obtain a physical address mapped to the virtual address. Whether the process has a permission to access the physical address mapped to the virtual address is determined according to the permission information. If the process has the permission to access the physical address mapped to the virtual address, the corresponding process is allowed to access the physical address mapped to the virtual address. If the process does not have the permission to access the physical address mapped to the virtual address, the corresponding process is not allowed to access the physical address mapped to the virtual address.

It should be noted that the segment set list and the segment configuration list may be looked up in parallel with the attribute configuration list, and the address segment table and the address segment attribute table may be looked up in parallel.

In some embodiments, the data structure of the address segment table is a radix tree. If the physical addresses to be accessed by two processes are located at the same physical address space segment, the two processes may share a lowest segment table level of the address segment tables, that is, the lowest segment table levels of the two address segment tables corresponding to the two processes are the same, while their non-lowest segment table levels are different. If the physical addresses to be accessed by the two processes are located at different physical address space segments, the two processes correspond to different address segment tables, that is, the two processes cannot share the lowest segment table level. Different processes correspond to different address segment attribute tables.

Figure 11:
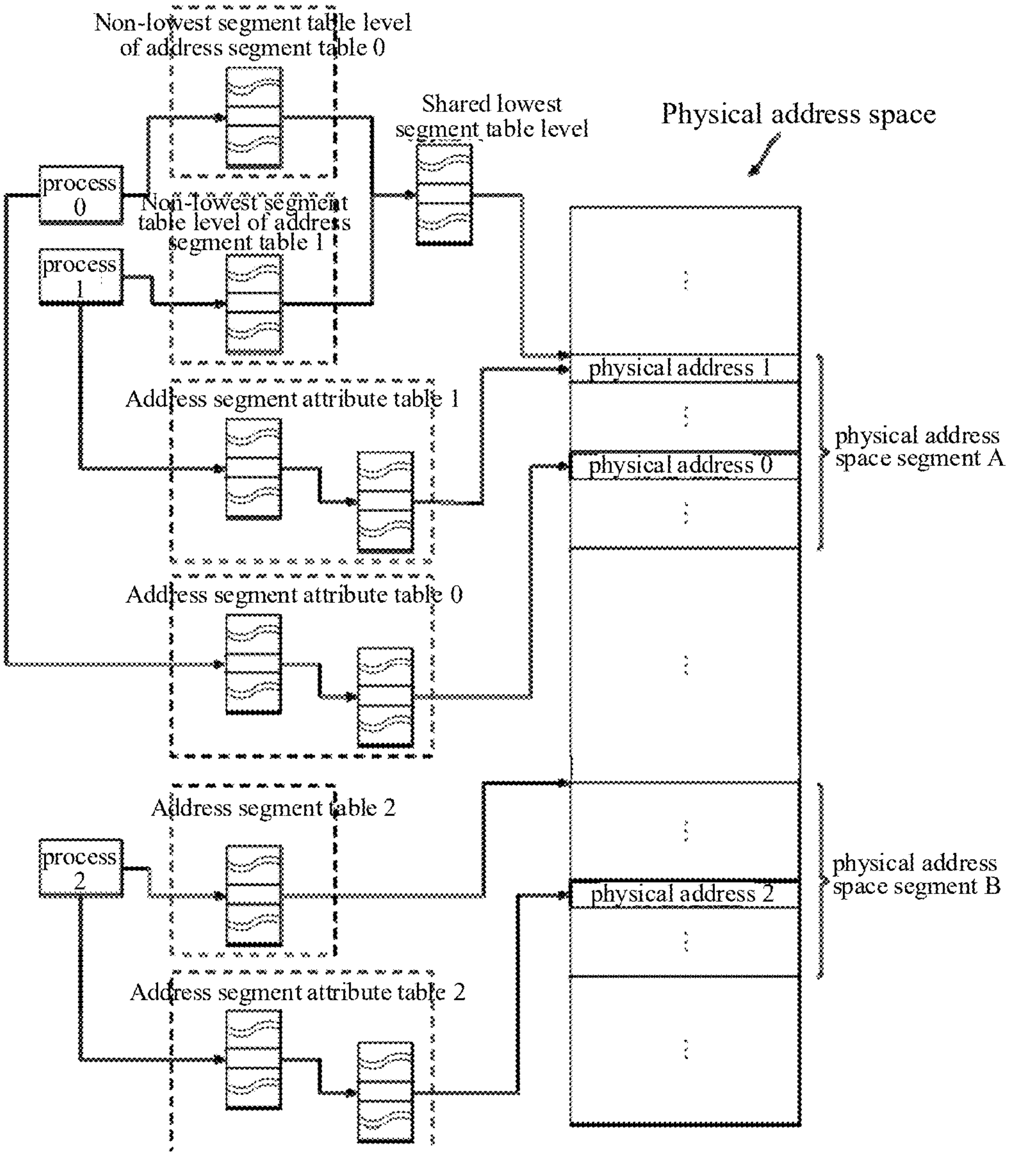
FIG. 11 is a schematic diagram showing look up process when a process accesses a memory table according to another embodiment of the present disclosure.

FIG. 11 is a schematic diagram showing look up process when a process accesses a memory table according to another embodiment of the present disclosure. As shown in FIG. 11, the physical address to be accessed by process 0 and the physical address to be accessed by process 1 are both located at physical address space segment A, and the physical address to be accessed by process 2 is located at physical address space segment B. Therefore, process 0 and process 1 can share the same lowest segment table level, while process 2 cannot share the last segment table level with process 0 and process 1, and process 2 needs to correspond to an independent address segment table. Understandably, FIG. 11 illustrates that process 2 cannot share the lowest segment table level with process 0 and process 1. However, in practical disclosure scenarios, process 2 may share the lowest segment table level with other processes other than process 0 and process 1. Alternatively, process 2 may not share the lowest segment table level with other processes.

In one example, an address segment table includes 3 segment table levels. The $3^{rd}$ segment table levels of the two address segment tables corresponding to process 0 and process 1 are the same, while the $1^{st}$ segment table levels of the two address segment tables are different, and the $2^{nd}$ segment table levels of the two address segment tables are different.

In one example, when the segment granularity is 4 GB, the size of physical address space segment A and the size of physical address space segment B are both 4 GB. Physical address space segment A and physical address space segment B may be adjacent physical address space segments within a physical address space, or non-adjacent physical address space segments within the physical address space.

Process 0 may access a physical address space sub-segment within physical address space segment A that it has an access permission, but cannot access a physical address space sub-segment within physical address space segment A that it does not have an access permission. Process 1 may access a physical address space sub-segment within physical address space segment A that it has an access permission, but cannot access a physical address space sub-segment within physical address space segment A that it does not have an access permission. Process 2 may access a physical address space sub-segment within physical address space segment B that it has an access permission, but cannot access a physical address space sub-segment within physical address space segment B that it does not have an access permission.

As shown in FIG. 11, the address segment table corresponding to process 0 is address segment table 0, the address segment table corresponding to process 1 is address segment table 1, the address segment table corresponding to process 2 is address segment table 2, and address segment table 0 and address segment table 1 share the lowest segment table level. The address segment attribute table corresponding to process 0 is address segment attribute table 0, the address segment attribute table corresponding to process 1 is address segment attribute table 1, and the address segment attribute table corresponding to process 2 is address segment attribute table 2.

After virtual address 0 is received from process 0, a base address of a lowest-level address segment sub-table is found from a non-lowest segment table level of address segment table 0 according to a first virtual address segment included in virtual address 0, an entry storing a base address of physical address space segment A is found from the shared lowest segment table level according to the base address of the lowest-level address segment sub-table and the first virtual address segment included in virtual address 0, and then the base address of physical address space segment A is read from the entry. Offset information 0 is found from address segment attribute table 0 according to a second virtual address segment included in virtual address 0. Physical address 0 mapped to virtual address 0 is determined according to the base address of physical address space segment A, offset information 0, and low bits of virtual address 0.

After virtual address 1 is received from process 1, a base address of a lowest-level address segment sub-table is found from a non-lowest segment table level of address segment table 1 according to a first virtual address segment included in virtual address 1, an entry storing a base address of physical address space segment A is found from the shared lowest segment table level according to the base address of the lowest-level address segment sub-table and the first virtual address segment included in virtual address 1, and then the base address of physical address space segment A is read from the entry. Offset information 1 is found from address segment attribute table 1 according to a second virtual address segment included in virtual address 1. Physical address 1 mapped to virtual address 1 is determined according to the base address of physical address space segment A, offset information 1, and low bits of virtual address 1.

After virtual address 2 is received from process 2, a base address of physical address space segment B is found from address segment table 2 according to a first virtual address segment included in virtual address 2. Offset information 2 is found from address segment attribute table 2 according to a second virtual address segment included in virtual address 2. Physical address 2 mapped to virtual address 2 is determined according to the base address of physical address space segment B, offset information 2, and low bits of virtual address 2.

It should be noted that the table structures of the address segment table and the address segment attribute table, and the lookup methods for the address segment table and the address segment attribute table in the embodiment of the present disclosure, are the same as those in the foregoing embodiments and will not be repeated here.

In the embodiment of the present disclosure, different processes accessing physical addresses located at the same physical address space segment may share a lowest segment table level of an address segment table, that is, share address segment sub-tables included in the lowest segment table level. For different address segment tables at the shared lowest segment table level, only one copy of address segment sub-tables included in the lowest segment table level need to be stored, thereby reducing storage resources occupied by the address segment table.

In some embodiments, in order to improve the efficiency of looking up the address segment table and the address segment attribute table, a segment table lookup buffer is provided for the address segment table, and an attribute table lookup buffer is provided for the address segment attribute table. After the address segment table is accessed to determine the base address information corresponding to the first virtual address segment, the corresponding relationship between the first virtual address segment and the base address information may be stored to the segment table lookup buffer. After the address segment attribute table is accessed to determine the offset information corresponding to the second virtual address segment, the corresponding relationship between the second virtual address segment and the offset information may be stored to the attribute table lookup buffer.

After the virtual address is received from the current process, the segment table lookup buffer is first accessed to determine whether there is base address information corresponding to the first virtual address segment in the virtual address. If there is base address information corresponding to the first virtual address segment in the virtual address, there is no need to access the address segment table. If there is no base address information corresponding to the first virtual address segment in the virtual address, the segment configuration list is accessed to determine the address segment table corresponding to the current process, and then the corresponding base address information is found from the address segment table.

After the virtual address is received from the current process, the attribute table lookup buffer is first accessed to determine whether there is offset information corresponding to the second virtual address segment in the virtual address. If there is offset information corresponding to the second virtual address segment in the virtual address, there is no need to access the address segment attribute table. If there is no offset information corresponding to the second virtual address segment in the virtual address, the attribute configuration list is accessed to determine the address segment attribute table corresponding to the current process, and then the corresponding offset information is found from the address segment attribute table.

It should be noted that the corresponding relationship between the first virtual address segment and the base address information stored in the segment table lookup buffer identifies which process it belongs to, and the corresponding relationship between the second virtual address segment and the offset information stored in the attribute table lookup buffer also identifies which process it belongs to.

Because the address segment table and the address segment attribute table are relatively shallow, the segment table lookup buffer and the attribute table lookup buffer have large memory reach, resulting in a high hit rate in the segment table lookup buffer and the attribute table lookup buffer, which can improve lookup performance.

It should be noted that the segment table lookup buffer and the attribute table lookup buffer may be accessed in parallel.

In the embodiment of the present disclosure, the segment table lookup buffer caches the found corresponding relationship between the first virtual address segment and the base address information, and the attribute table lookup buffer caches the found corresponding relationship between the second virtual address segment and the offset information, so that when the same process accesses physical addresses located in the same physical address space segment multiple times, multiple times of lookup for the address segment table can be avoided; and when the same process accesses physical addresses located in the same physical address space sub-segment multiple times, multiple times of lookup for the address segment attribute table can be avoided, thereby saving time for looking up the address segment table and/or the address segment attribute table and improving the efficiency of mapping virtual addresses to physical addresses.

In some embodiments, when the access space of the memory to be accessed by a process changes, because different processes correspond to different address segment attribute tables, the system software may adjust the address segment attribute table corresponding to the process without adjusting the address segment table, so as not to affect other processes. The system software may flexibly manage the address space according to the address segment table and the address segment attribute table.

In some embodiments, the system software may create one address segment table for a plurality of processes, where the physical address space corresponding to the address segment table is a segment of large contiguous address space A, with large granularity. When address segment attribute tables are created for different processes respectively, the address segment attribute tables have small granularity, thereby accurately controlling granularity access permissions to address space A. On the one hand, the parallelism of table lookup is improved and the overall depth of list lookup is reduced. On the other hand, the address segment attribute table can control granularity access permissions to address space A, thereby enabling efficient utilization of address space A without causing memory fragmentation.

It should be noted that the base addresses in the foregoing embodiments refer to physical base addresses.

Memory Management Unit

Figure 12:
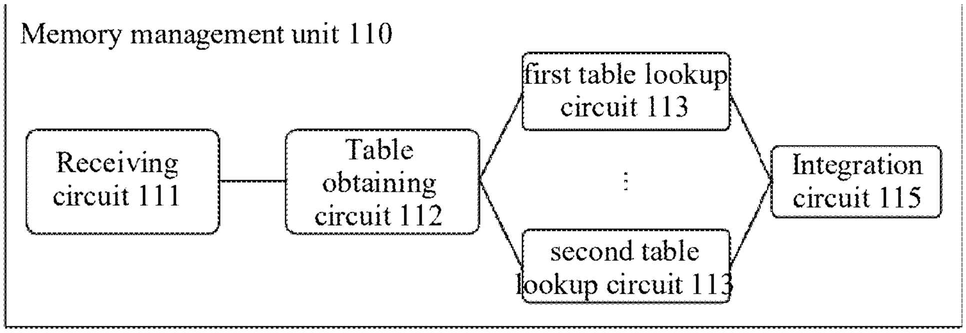
FIG. 12 is a schematic diagram of a memory management unit according to an embodiment of the present disclosure.

FIG. 12 is a block diagram of a memory management unit according to an embodiment of the present disclosure. As shown in FIG. 12, the memory management unit 110 includes: a receiving circuit 111, a list obtaining circuit 112, a first list lookup circuit 113, a second list lookup circuit 114, and an integration circuit 115.

The receiving circuit 111 receives a virtual address from a current process. The list obtaining circuit 112 determines an address segment table and an address segment attribute table corresponding to the current process according to identification information of the current process. The first list lookup circuit 113 finds base address information from the address segment table according to a first virtual address segment included in the virtual address, where the base address information is used for indicating a base address of a target physical address space segment, and the target physical address space segment is a physical address space segment where a physical address mapped to the virtual address is located. The second list lookup circuit 114 finds offset information from the address segment attribute table according to a second virtual address segment included in the virtual address, where the offset information is used for indicating an offset of the physical address mapped to the virtual address within the target physical address space segment. The integration circuit 115 determines the physical address mapped to the virtual address according to the base address information and the offset information.

In the embodiment of the present disclosure, the receiving circuit 111 receives a virtual address from a process, the list obtaining circuit 112 obtains an address segment table and an address segment attribute table corresponding to the process, the first list lookup circuit 113 finds base address information from the address segment table according to a first virtual address segment included in the virtual address, the base address information indicates a base address of a target physical address space segment where a physical address mapped to the virtual address is located, the second list lookup circuit 114 finds offset information from the address segment attribute table according to a second virtual address segment included in the virtual address, the offset information indicates an offset of the physical address mapped to the virtual address within the target physical address space segment, and then the integration circuit 115 determines the physical address mapped to the virtual address according to the base address information and the offset information. Because the address segment table and the address segment attribute table are found in parallel, and the address segment table and the address segment attribute table are found separately according to the first virtual address segment and the second virtual address segment, the lookup depth for the address segment table and the address segment attribute table is reduced, and the time for finding the address segment table and the address segment attribute table is shortened, which improves the efficiency of mapping virtual addresses to physical addresses.

The memory management unit may be a system memory management unit (SMMU), an input/output memory management unit (IOMMU), or the like.

It should be noted that the memory management unit 110 in this embodiment is configured to implement the memory address mapping method in the foregoing method embodiments. The interaction between the modules and units in the memory management unit 110 may be referred to in the description of the foregoing memory address mapping method embodiments, and has the beneficial effects of the corresponding method embodiments, which will not be repeated here.

Electronic Device

Figure 13:
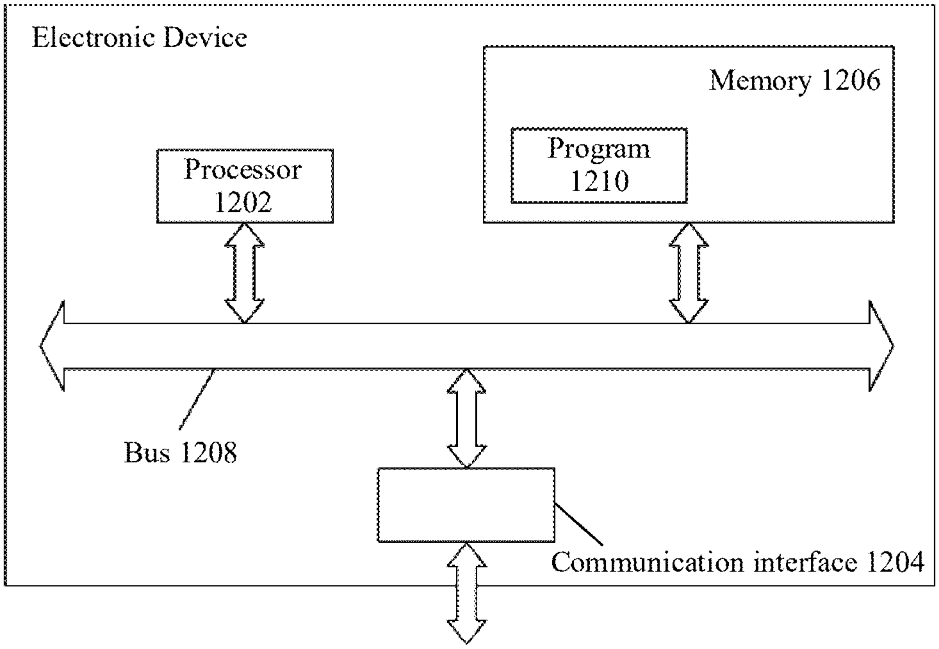
FIG. 13 is a schematic diagram of an electronic device according to an embodiment of the present disclosure.

FIG. 13 is a schematic block diagram of an electronic device according to an embodiment of the present disclosure. The specific embodiments of the present disclosure do not limit the specific implementation of the electronic device. As shown in FIG. 13, the electronic device may include: a processor 1202, a communications interface 1204, a memory 1206, and a communications bus 1208.

The processor 1202, the communications interface 1204, and the memory 1206 communicates with each other through the communications bus 1208.

The communications interface 1204 is configured to communicate with other electronic devices or servers.

The processor 1202 is configured to execute a program 1210, specifically execute the relevant steps in any of the foregoing memory address mapping method embodiments.

Specifically, the program 1210 may include program code including computer operation instructions.

The processor 1202 may be a CPU, or an disclosure specific integrated circuit (ASIC), or one or more integrated circuits configured to implement the embodiments of the present disclosure. The one or more processors included in the electronic device may be of the same type, such as one or more CPUs, or may be of different types, such as one or more CPUs and one or more ASICs.

RISC-V is an open-source instruction set architecture based on the reduced instruction set (RISC) principle, which may be applied to various aspects such as microcontrollers and FPGA chips, specifically applied in the fields of things of Internet security, industrial control, mobile phones, personal computers, etc. Due to its consideration of small size, high speed, and low power consumption in design, it is particularly suitable for modern computing devices such as warehouse-scale cloud computers, high-end mobile phones, and micro embedded systems. With the rise of artificial intelligence of things (AIoT), the RISC-V instruction set architecture has also received increasing attention and support, and is expected to become the next generation of widely used CPU architecture.

The computer operation instructions in the embodiment of the present disclosure may be based on the RISC-V instruction set architecture, and correspondingly, the processor 1202 may be designed based on an RISC-V instruction set. Specifically, the chip of the processor in the electronic device provided in the embodiment of the present disclosure may be a chip designed using the RISC-V instruction set, and the chip may execute executable code based on the configured instructions to implement the memory address mapping method in the foregoing embodiments.

The memory 1206 is configured to store the computer program 1210. The memory 1206 may include a high-speed random access memory (RAM), and may further include a non-volatile memory, such as at least one disk memory.

The program 1210 may be specifically used for enabling the processor 1202 to perform the memory address mapping method in any of the foregoing embodiments.

The specific implementation of each step in the program 1210 may be found in the description of the corresponding step and unit in any of the foregoing memory address mapping method embodiments, and will not be repeated here. Those skilled in the art may clearly learn that, for the convenience and conciseness of the description, the specific working processes of the devices and modules described above may refer to the corresponding process descriptions in the foregoing method embodiments, and will not be described in detail here.

Through the electronic device in the embodiment of the present disclosure, base address information is looked up from an address segment table according to a first virtual address segment included in a virtual address, where the base address information may indicate a base address of a target physical address space segment where a physical address mapped to the virtual address is located; offset information is looked up from an address segment attribute table according to a second virtual address segment included in the virtual address, where the offset information may indicate an offset of the physical address mapped to the virtual address within the target physical address space segment; and then the physical address mapped to the virtual address may be determined according to the base address information and the offset information. Because the address segment table and the address segment attribute table can be looked up in parallel, and the address segment table and the address segment attribute table are looked up separately according to the first virtual address segment and the second virtual address segment, the lookup depth for the address segment table and the address segment attribute table can be reduced, and the time for looking up the address segment table and the address segment attribute table is shortened, which can improve the efficiency of mapping virtual addresses to physical addresses.

Computer Storage Medium

The present disclosure further provides a computer-readable storage medium storing instructions enabling a machine to perform the memory address mapping method as described herein. Specifically, a system or apparatus equipped with the storage medium may be provided, the storage medium stores software program code for implementing the functions of any of the foregoing embodiments, and a computer (or CPU or MPU) of the system or apparatus reads and executes the program code stored in the storage medium.

In this case, the program code read from the storage medium may implement the functions of any of the foregoing embodiments. Therefore, the program code and the storage medium storing the program code constitute a part of the present disclosure.

Examples of the storage medium for providing program code include a soft disk, a hard disk, a magneto-optical disk, an optical disk (such as CD-ROM, CD-R, CD-RW, DVD-ROM, DVD-RAM, DVD-RW, or DVD+RW), a magnetic tape, a non-volatile memory card, or an ROM. Optionally, the program code may be downloaded from a server computer via a communication network.

Computer Program Product

An embodiment of the present disclosure further provides a computer program product, including computer instructions that instruct a computing device to perform any corresponding operation in the foregoing method embodiments.

It should be pointed out that, according to the needs of implementation, each component/step described in the embodiments of the present disclosure may be split into more components/steps, or two or more components/steps or some operations of a component/step may be combined into new components/steps to achieve the objectives of the embodiments of the present disclosure.

The method described above according to the embodiments of the present disclosure may be implemented in hardware or firmware, or implemented as software or computer code capable of being stored in a recording medium (such as a CD ROM, an RAM, a soft disk, a hard disk, or a magneto-optical disk), or implemented as computer code downloaded through a network, originally stored in a remote recording medium or a non-transient machine readable medium, and going to be stored in a local recording medium, so that the method described here may be processed by such software stored on the recording medium using a general-purpose computer, a dedicated processor, or programmable or dedicated hardware (such as ASIC or FPGA). It should be appreciated that the computer, processor, microprocessor controller, or programmable hardware includes a storage component (such as an RAM, an ROM, or a flash memory) capable of storing or receiving software or computer code, and when the software or computer code is accessed and executed by the computer, processor, or hardware, the method described herein is implemented. In addition, when the general-purpose computer accesses the code for implementing the method shown here, the execution of the code converts the general-purpose computer into a dedicated computer for executing the method shown here.

It should be noted that user-related information (including but not limited to user equipment information, user personal information, etc.) and data (including but not limited to sample data used for model training, data used for analysis, stored data, displayed data, etc.) involved in the embodiments of the present disclosure are all authorized by the user or fully authorized by all parties. In addition, the collection, use, and processing of relevant data need to comply with relevant laws, regulations, and standards of relevant countries and regions, and provide corresponding operation entrances for users to choose authorization or refusal.

Understandably, the embodiments in the specification are described in a progressive way, same and similar parts among the embodiments can refer to each other, and each embodiment focuses on differences from the other embodiments. In particular, for the method embodiments, which are substantially similar to the methods described in the apparatus and system embodiments, the descriptions are relatively simple, and where relevant, reference can be made to partial descriptions of the other embodiments.

It should be understood that specific embodiments of this specification are described above. Other embodiments fall within the scope of the claims. In some cases, the actions or steps recited in the claims may be performed in a different order from those in the embodiments and still achieve desired results. In addition, the processes depicted in the accompanying drawings do not necessarily require the particular order or sequential order shown to achieve the desired results. In some implementations, multitasking processing and parallel processing are possible or may be advantageous.

It should be understood that describing an element in a singular form or displaying only one element in the accompanying drawings does not mean limiting the quantity of the element to one. Moreover, the modules or elements described or illustrated as separate herein may be combined into a single module or element, and the modules or elements described or illustrated as single herein may be split into a plurality of modules or elements.

It should also be understood that the terms and expressions used herein are for descriptive purposes only, and one or more embodiments of this specification should not be limited to these terms and expressions. The use of these terms and expressions does not mean excluding any illustrated and described (or parts thereof) equivalent features, and it should be recognized that various modifications that may exist should also be included within the scope of the claims. Other modifications, changes, and substitutions may also exist. Accordingly, the claims should be regarded as covering all these equivalents.

What is claimed is:

1. A memory address mapping method, comprising:
- receiving a virtual address from a current process;
- determining an address segment table and an address segment attribute table corresponding to the current process according to identification information of the current process;
- finding base address information from the address segment table according to a first virtual address segment in the virtual address, wherein the base address information is used for indicating a base address of a target physical address space segment, and the target physical address space segment is a physical address space segment where a physical address mapped to the virtual address is located;
- finding offset information from the address segment attribute table according to a second virtual address segment in the virtual address; and
- determining the physical address mapped to the virtual address according to the base address information and the offset information,
- wherein the target physical address space segment comprises a plurality of physical address space sub-segments, the physical address mapped to the virtual address is located within a target physical address space sub-segment among the plurality of physical address space sub-segments,
- the determining the physical address mapped to the virtual address according to the base address information and the offset information comprises:
- adding the base address information with the offset information to obtain the base address of the target physical address space sub-segment; and
- adding the base address of the target physical address space sub-segment with a third virtual address segment in the virtual address to obtain the physical address mapped to the virtual address, wherein the first virtual address segment, the second virtual address segment, and the third virtual address segment are sequentially adjacent in the virtual address, and the third virtual address segment is located at lower bits of the virtual address than the first virtual address segment and the second virtual address segment.

2. The method according to claim 1, wherein the address segment table corresponds to a plurality of processes including the current process, and different processes correspond to different address segment attribute tables.

3. The method according to claim 1, wherein the address segment table is of a linear list structure or a radix tree structure.

4. The method according to claim 1, wherein the address segment attribute table is of a linear list structure or a radix tree structure.

5. The method according to claim 1, wherein the address segment table is of a linear list structure or a radix tree structure, and the address segment attribute table is of a linear list structure or a radix tree structure.

6. The method according to claim 1, wherein the address segment table is of a radix tree structure, the address segment table comprises at least two segment table levels, the highest segment table level among the at least two segment table levels comprises one address segment sub-table, each non-highest segment table level among the at least two segment table levels comprises a plurality of address segment sub-tables, and each address segment sub-table comprises a plurality of entries;

different entries of each address segment sub-table located at the lowest segment table level among the at least two segment table levels correspond to different physical address space segments, and each entry of each address segment sub-table located at the lowest segment table level is used for storing at least the base address of the physical address space segment corresponding to the entry;

when a number of the at least two segment table levels is two, each entry of the one address segment sub-table located at the highest segment table level among the at least two segment table levels is used for storing a base address of the address segment sub-table, corresponding to the entry, in the lowest segment table level, and different entries of the one address segment sub-table located at the highest segment table level correspond to different address segment sub-tables in the lowest segment table level; and when the number of the at least two segment table levels is greater than two, the non-lowest segment table levels among the at least two segment table levels comprise the highest segment table level and one or more middle segment table levels, each entry of each address segment sub-table located at each non-lowest segment table levels is used for storing a base address of the address segment sub-table, corresponding to the entry, in the next lower segment table level, and different entries of the address segment sub-tables located at the same non-lowest segment table level correspond to different address segment sub-tables in the next lower segment table level.

7. The method according to claim 6, wherein the finding base address information from the address segment table according to a first virtual address segment in the virtual address comprises:

shifting the virtual address sub-segment corresponding to the $i^{th}$ segment table level in the first virtual address segment to the left by n bits, then adding the shifted virtual address sub-segment to the base address of the $i^{th}$ address segment sub-table to obtain an $i^{th}$ segment table entry address, and obtaining a base address of the $(i+1)^{th}$ address segment sub-table stored in the entry pointed to by the $i^{th}$ segment table entry address in the $i^{th}$ address segment sub-table, wherein i is a positive integer less than N, N is equal to the quantity of the segment table levels, the base address of the $1^{st}$ address segment sub-table is a physical base address of the address segment table, and the data length of the entry located at the non-lowest segment table level in the address segment table is $2^n$ bytes; and shifting the virtual address sub-segment corresponding to the $N^{th}$ segment table level in the first virtual address segment to the left by n bits, adding the shifted virtual address sub-segment to the base address of the $N^{th}$ address segment sub-table to obtain an $N^{th}$ segment table entry address, and determining a base address stored in the entry pointed to by the $N^{th}$ segment table entry address in the $N^{th}$ address segment sub-table as the base address information.

8. The method according to claim 1, wherein the address segment attribute table is of a radix tree structure, the address segment attribute table comprises at least two attribute table levels, the highest attribute table level among the at least two attribute table levels comprises one attribute sub-table, each non-highest attribute table level among the at least two attribute table levels comprises a plurality of attribute sub-tables, and each attribute sub-table comprises a plurality of entries;

different entries of each attribute sub-table located at the lowest attribute table level among the at least two attribute table levels correspond to different physical address space sub-segments, and each entry of each attribute sub-table located at the lowest attribute table level is used for storing at least an offset of the base address of the physical address space sub-segment corresponding to the entry relative to the base address of the physical address space segment where the physical address space sub-segment is located;

when a number of the at least two attribute table levels is two, each entry located at the highest attribute table level among the at least two attribute table levels is used for storing a base address of the attribute sub-table, corresponding to the entry, in the lowest attribute table level, and different entries of the one attribute sub-table located at the highest attribute table level correspond to different attribute sub-tables in the lowest attribute table level; and when the number of the at least two attribute table levels is greater than two, the non-lowest attribute table levels among the at least two attribute table levels comprise the highest attribute table level and one or more middle attribute table levels, each entry of each attribute table level located at each non-lowest attribute table level among the at least two attribute table levels is used for storing a base address of the attribute sub-table, corresponding to the entry, in the next lower attribute table level, and different entries of the attribute table levels located at the same non-lowest attribute table level correspond to different attribute sub-tables in the next lower attribute table level.

9. The method according to claim 8, wherein the finding offset information from the address segment attribute table according to a second virtual address segment in the virtual address comprises:

shifting the virtual address sub-segment corresponding to the $j^{th}$ attribute table level in the second virtual address segment to the left by m bits, then adding the shifted virtual address sub-segment to the base address of the $j^{th}$ attribute sub-table to obtain a $j^{th}$ attribute table entry address, and obtaining a base address of the $(j+1)^{th}$ attribute sub-table stored in the entry pointed to by the $j^{th}$ attribute table entry address in the $j^{th}$ attribute sub-table, wherein j is a positive integer less than M, M is equal to the quantity of the attribute table levels, the base address of the $1^{st}$ attribute sub-table is a physical base address of the address segment attribute table, and the data length of the entry located at the non-lowest attribute table level in the address segment attribute table is 2m bytes; and shifting the virtual address sub-segment corresponding to the $M^{th}$ attribute table level in the second virtual address segment to the left by m bits, then adding the shifted virtual address sub-segment to the base address of the $(M-1)^{th}$ attribute sub-table to obtain an $M^{th}$ attribute table entry address, and determining an offset stored in the entry pointed to by the $M^{th}$ attribute table entry address in the $M^{th}$ attribute sub-table as the offset information.

10. The method according to claim 1, further comprising:

finding permission information from the address segment attribute table according to the second virtual address segment, wherein the permission information is used for indicating an access permission of the physical address mapped to the virtual address, and the permission information and the offset information are stored in the same entry in the address segment attribute table; and allowing the current process to access the physical address mapped to the virtual address in response to determining according to the permission information that the current process has a permission to access the physical address mapped to the virtual address; and rejecting the current process to access the physical address mapped to the virtual address in response to determining according to the permission information that the current process does not have the permission to access the physical address mapped to the virtual address.

11. The method according to claim 1, wherein the determining an address segment table and an address segment attribute table corresponding to the current process according to identification information of the current process comprises:

finding address segment identity information corresponding to the current process from a segment set table according to the identification information of the current process, wherein the segment set table stores corresponding relationships between identification information of the plurality of processes and address segment identity information, and the same address segment identity information in the segment set table corresponds to the identification information of at least one process;

finding an address segment table base address corresponding to the current process from a segment configuration table according to the address segment identity information corresponding to the current process, wherein the segment configuration table stores corresponding relationships between a plurality of pieces of address segment identity information and address segment table base addresses, and different address segment identity information corresponds to different address segment table base addresses;

determining an address segment table whose base address is the address segment table base address corresponding to the current process, as the address segment table corresponding to the current process;

finding an attribute table base address corresponding to the current process from an attribute configuration table according to the identification information of the current process, wherein the attribute configuration table stores corresponding relationships between identification information of a plurality of processes and attribute table base addresses, and different identification information corresponds to different attribute table base addresses; and determining an address segment attribute table whose base address is the attribute table base address corresponding to the current process, as the address segment attribute table corresponding to the current process.

12. The method according to claim 11, further comprising:

finding the base address information from a segment table lookup buffer according to the address segment identity information corresponding to the current process; and finding the offset information from an attribute table lookup buffer according to the identification information of the current process.

13. An electronic device, comprising: a processor, a memory, a communications interface, and a communications bus, wherein the processor, the memory, and the communications interface complete communication with each other through the communications bus; and the memory is configured to store at least one executable instruction that enables the processor to perform a memory address mapping method, wherein the memory address mapping method comprises:

receiving a virtual address from a current process;

determining an address segment table and an address segment attribute table corresponding to the current process according to identification information of the current process;

finding base address information from the address segment table according to a first virtual address segment in the virtual address, wherein the base address information is used for indicating a base address of a target physical address space segment, and the target physical address space segment is a physical address space segment where a physical address mapped to the virtual address is located;

finding offset information from the address segment attribute table according to a second virtual address segment in the virtual address; and determining the physical address mapped to the virtual address according to the base address information and the offset information, wherein the target physical address space segment comprises a plurality of physical address space sub-segments, the physical address mapped to the virtual address is located within a target physical address space sub-segment among the plurality of physical address space sub-segments, the determining the physical address mapped to the virtual address according to the base address information and the offset information comprises:

adding the base address information with the offset information to obtain the base address of the target physical address space sub-segment; and adding the base address of the target physical address space sub-segment with a third virtual address segment included in the virtual address to obtain the physical address mapped to the virtual address, wherein the first virtual address segment, the second virtual address segment, and the third virtual address segment are sequentially adjacent in the virtual address, and the third virtual address segment is located at lower bits of the virtual address than the first virtual address segment and the second virtual address segment.

14. A non-transitory computer-readable storage medium, storing a computer program that, when executed by a processor, implements a memory address mapping method, wherein the memory address mapping method comprises:

receiving a virtual address from a current process;

determining an address segment table and an address segment attribute table corresponding to the current process according to identification information of the current process;

finding base address information from the address segment table according to a first virtual address segment in the virtual address, wherein the base address information is used for indicating a base address of a target physical address space segment, and the target physical address space segment is a physical address space segment where a physical address mapped to the virtual address is located;

finding offset information from the address segment attribute table according to a second virtual address segment in the virtual address; and determining the physical address mapped to the virtual address according to the base address information and the offset information, wherein the target physical address space segment comprises a plurality of physical address space sub-segments, the physical address mapped to the virtual address is located within a target physical address space sub-segment among the plurality of physical address space sub-segments, the determining the physical address mapped to the virtual address according to the base address information and the offset information comprises:

adding the base address information with the offset information to obtain the base address of the target physical address space sub-segment; and adding the base address of the target physical address space sub-segment with a third virtual address segment included in the virtual address to obtain the physical address mapped to the virtual address, wherein the first virtual address segment, the second virtual address segment, and the third virtual address segment are sequentially adjacent in the virtual address, and the third virtual address segment is located at lower bits of the virtual address than the first virtual address segment and the second virtual address segment.

* * * * *